US009160271B2

(12) United States Patent
Yamasaki et al.

(10) Patent No.: US 9,160,271 B2
(45) Date of Patent: Oct. 13, 2015

(54) POWER CONVERSION DEVICE

(75) Inventors: Hisanori Yamasaki, Tokyo (JP); Keita Hatanaka, Tokyo (JP); Hidetoshi Kitanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 23 days.

(21) Appl. No.: 14/348,956

(22) PCT Filed: Jan. 18, 2012

(86) PCT No.: PCT/JP2012/050900
§ 371 (c)(1),
(2), (4) Date: Apr. 1, 2014

(87) PCT Pub. No.: WO2013/108374
PCT Pub. Date: Jul. 25, 2013

(65) Prior Publication Data
US 2014/0247003 A1   Sep. 4, 2014

(51) Int. Cl.
H02P 27/04 (2006.01)
H02P 27/06 (2006.01)
G05B 19/00 (2006.01)
(Continued)

(52) U.S. Cl.
CPC .................. *H02P 27/06* (2013.01); *B60L 9/005* (2013.01); *B60L 15/025* (2013.01); *G05B 19/00* (2013.01); *H02P 21/05* (2013.01); *H02P 29/0038* (2013.01); *H02M 1/15* (2013.01); *H02M 5/4585* (2013.01); *H02P 2207/01* (2013.01)

(58) Field of Classification Search
CPC .......................... B60L 15/025; Y02T 10/643
USPC .................................................. 318/802, 434
See application file for complete search history.

(56) References Cited

U.S. PATENT DOCUMENTS 5,250,890 A   10/1993  Tanamachi et al.
5,532,569 A    7/1996  Tanamachi et al.
(Continued)

FOREIGN PATENT DOCUMENTS

JP  5 31400   5/1993
JP  7 46918   5/1995
(Continued)

OTHER PUBLICATIONS

Sugimoto, H. et al. "Theory and Actual of AC Servo System." Sogo Electronics Press, pp. 99-134, 1990.
(Continued)

*Primary Examiner* — Erick Glass
(74) *Attorney, Agent, or Firm* — Oblon, McClelland, Maier & Neustadt, L.L.P.

(57) ABSTRACT

A power conversion device formed of a converter for rectifying a single-phase AC voltage to a DC voltage and an inverter for driving an AC motor by converting the DC voltage to an AC voltage includes: a first compensation unit that uses a frequency component twice the frequency of the single-phase AC voltage with respect to the DC voltage outputted from the converter or a current outputted from the inverter as a compensation value for at least one of a torque command value, a current command value, a voltage command value, a frequency command value, and a phase angle command value; and a second compensation unit that uses the DC voltage outputted from the converter or a current outputted from the inverter after being subjected to low frequency cut-off processing and gain processing.

8 Claims, 24 Drawing Sheets

(51) Int. Cl.
*H02P 29/00* (2006.01)
*H02P 21/05* (2006.01)
*B60L 9/00* (2006.01)
*B60L 15/02* (2006.01)
*H02M 1/15* (2006.01)
*H02M 5/458* (2006.01)

(56) References Cited

U.S. PATENT DOCUMENTS

| | | | |
|---|---|---|---|
| 6,307,759 | B1 | 10/2001 | Inarida et al. |
| 6,437,997 | B1 | 8/2002 | Inarida et al. |
| 2008/0265809 | A1* | 10/2008 | Ol et al. .................. 318/139 |
| 2010/0066283 | A1* | 3/2010 | Kitanaka .............. 318/400.02 |
| 2011/0175558 | A1 | 7/2011 | Kitanaka |
| 2011/0234144 | A1* | 9/2011 | Maekawa ..................... 318/702 |
| 2014/0176028 | A1* | 6/2014 | Tobari et al. ............ 318/400.02 |

FOREIGN PATENT DOCUMENTS

| | | |
|---|---|---|
| JP | 11 285299 | 10/1999 |
| JP | 3226258 | 11/2001 |
| JP | 4010190 | 11/2007 |
| JP | 4819970 | 11/2011 |

OTHER PUBLICATIONS

Kinpara, Y. et al. "Speed Sensorless Vector Control Method of Induction Motor Including a low Speed Region" The Institute of Electrical Engineers of Japan, T.IEE, vol. 120, No. 2, pp. 1-7, 2000 (with English abstract).

Kinpara, Y. et al. "Position Sensorless Control of PM Motor Adaptive Observer on Rotational Coordinate" The Institute of Electrical Engineers of Japan, T.IEE, Transaction on Industry Application, vol. 123, No. 5, pp. 600-609, 2003 (with English abstract).

International Search Report Issued Apr. 17, 2012 in PCT/JP12/050900 Filed Jan. 18, 2012.

\* cited by examiner

MOTOR ELECTRIC ANGULAR ROTATIONAL FREQUENCY
FM=40Hz (2f FREQUENCY OF SINGLE-PHASE POWER SUPPLY)

MOTOR ELECTRIC ANGULAR ROTATIONAL FREQUENCY (2f FREQUENCY OF SINGLE-PHASE POWER SUPPLY)
100Hz

POWER CONVERSION DEVICE

TECHNICAL FIELD

The present invention relates to a power conversion device formed of a converter that converts AC to DC and an inverter that converts a DC output of the converter to AC, and more particularly, to a power conversion device suppressing a beat phenomenon accompanying a rectification pulsation resulting from rectification by the converter when an AC motor is driven at a variable speed by the inverter.

BACKGROUND ART

For example, a drive device of an electric car adopts a configuration in which AC from a power collector, such as a pantograph sliding on wiring connected to an AC power supply, is converted to DC by a converter via a transformer, and DC is further converted to three-phase AC power via an inverter so as to drive a three-phase induction motor.

In the power conversion device in the related art of this type, a DC voltage at an output end of the converter is superimposed with a component that pulsates at twice the frequency of an AC power-supply voltage and this component becomes a factor of a beat in an output current of the three-phase induction motor. In order to suppress this beat phenomenon, there has been proposed a technique aimed at cancelling out a frequency twice the frequency of an AC power-supply voltage in the DC voltage by detecting a harmonic component twice the frequency of the AC power-supply voltage and adjusting a slip frequency of the induction motor on the basis of the detection result (see PTL 1 and PTL 2). By increasing a capacity of a smoothing capacitor provided to a DC stage, this pulsation frequency component can be reduced to some extent but cannot be removed completely. Also, such an increase of the capacity raises a problem that a size of the device becomes larger.

CITED LIST

Patent Literature

PTL 1: JP-B-5-31400
PTL 2: JP-B-7-46918
PTL 3: Japanese Patent No. 4010190
PTL 4: JP-A-11-285299
PTL 5: Japanese Patent No. 3226258
PTL 6: Japanese Patent No. 4819970

Non-Patent Literature

NPL 1: *Theory and Actual Design of AC Servo System*, Sogo Electronics Press, 1990, pp. 99-134
NPL 2: *Speed Sensorless Vector Control Method of Induction Motor Including A Low Speed Region*, the Institute of Electrical Engineers of Japan, Transactions on Industry Application, Vol. 120, No. 2, 2000
NPL 3: *Position Sensorless Control of PM Motor Using Adaptive Observer on Rotational Coordinate*, the Institute of Electrical Engineers of Japan, Transactions on Industry Application, Vol. 123, No. 5, 2003

SUMMARY OF INVENTION

Technical Problem

As has been described above, a DC voltage at the output end of the converter is superimposed with a component pulsating at twice the frequency of the AC power-supply voltage and this component becomes a factor of a beat in an output current of the three-phase induction motor. The magnitude of a pulsation of the DC voltage depends not only on the magnitude of output power of the three-phase induction motor via the three-phase inverter and a capacity of the smoothing capacitor, but also on a circuit constant of the motor, that is, responsiveness of the motor, and thus there occurs a problem that the pulsation becomes too large under some conditions, thereby unable to obtain satisfactory effect of beat suppression control on an output current, that is, so-called beatless control.

The invention was devised to solve the problems discussed above and has an object to provide a power conversion device capable of operating a motor in a stable manner by preventing the magnitude of a pulsation of a DC voltage from becoming too large by improving control characteristics of an AC motor controlled by an inverter, and thereby improving the beat suppression effect on a motor current by the beatless control.

Solution to Problem

A power conversion device of the invention includes: converter means for converting an AC voltage to a DC voltage through rectification; inverter means for feeding a motor by converting the DC voltage as an output of the converter means to an AC voltage; current command value generation means for outputting a current command value for the motor according to a torque command value; frequency command value generation means for outputting a frequency command value of a voltage for the motor according to a speed signal of the motor; phase angle command value generation means for calculating a phase angle command value on the basis of speed information or axis position information of the motor; voltage command value generation means for generating a voltage command value to the inverter means using the current command value, the frequency command value, and the phase angle command value; and compensation means for adding a compensation amount to or subtracting the compensation amount from at least one of the torque command value, the current command value, the voltage command value, the frequency command value, and the phase angle command value. The power conversion device is characterized in that the compensation means includes: first compensation means for extracting a frequency component twice a frequency of the AC voltage from the DC voltage outputted from the converter means or a current outputted from the inverter means to apply gain processing to the extracted component, and using a result of the processing as a compensation value for at least one of the torque command value, the current command value, the voltage command value, the frequency command value, and the phase angle command value; and second compensation means for applying low frequency cut-off processing using a frequency selected at or below an electric angular maximum frequency of the motor as a cut-off frequency and gain processing to the DC voltage outputted from the converter means or a current outputted from the inverter means, and using a result of the processing as a compensation value for at least one of the torque command value, the current command value, the voltage command value, the frequency command value, and the phase angle command value.

Advantages Effects of Invention

In order to suppress a beat in an inverter output current resulting from a pulsation of a frequency component twice the frequency of a single-phase AC voltage superimposed on a DC voltage, second compensation means taking responsiveness of a motor into consideration is provided in addition to a function of first compensation means for extracting and then suppressing the frequency component twice the frequency of the single-phase AC voltage. Owing to this configuration, it becomes possible to enhance performance to suppress a beat in an inverter output current without depending on a capacity of a capacitor provided to converter means and response characteristics of the motor.

BRIEF DESCRIPTION OF DRAWINGS

FIG. 7 is driven by additionally providing the second compensation means of the first embodiment.

DESCRIPTION OF EMBODIMENTS

First Embodiment

Figure 1:
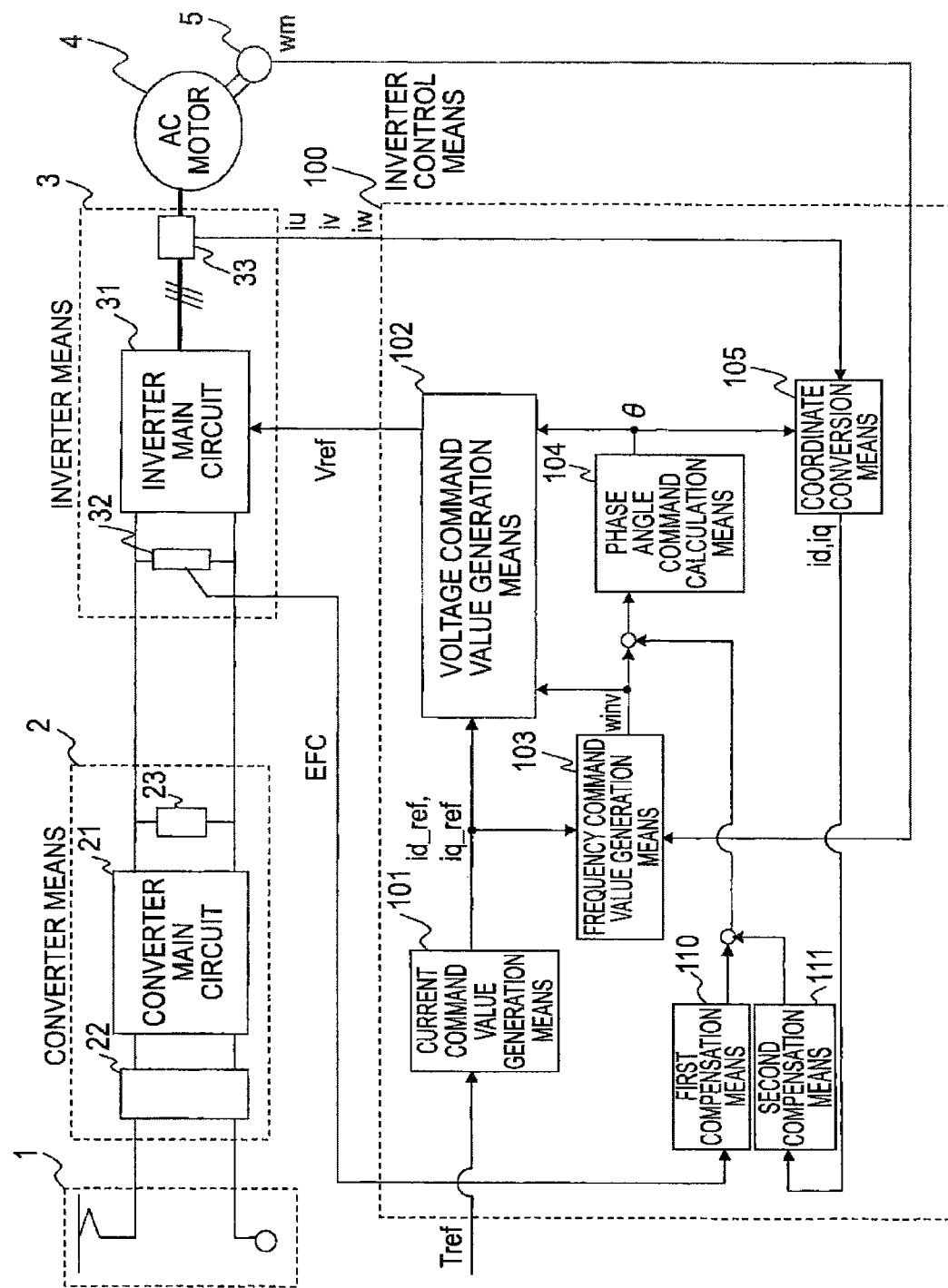
FIG. 1 is schematic circuit diagram showing a configuration example of a power conversion device according to a first embodiment of the invention.

FIG. 1 shows an overall configuration of a power conversion device of a first embodiment. Referring to the drawing, a single-phase AC power supply 1 is formed of wiring or a pantograph in the case of an electric rail vehicle using AC wiring and supplies converter means 2 with a single-phase AC voltage from a transformer station.

The converter means 2 is formed of a converter main circuit 21 made up of semiconductor switching elements, an input transformer 22 that steps down a voltage of the single-phase AC power supply 1, a smoothing capacitor 23, and so on, and is furnished with a function of outputting a DC voltage by rectifying a single-phase AC voltage. Because the principle of its operation is known and not directly relevant the content of this application, a description is omitted herein.

In a case where single-phase AC is rectified, a DC voltage as an output is superimposed with a pulsation having a frequency component twice the frequency of a single-phase AC power supply. Amplitude of this voltage pulsation can be narrowed by increasing a capacity of the smoothing capacitor 23. It is, however, general to permit a minor voltage pulsation by selecting the smoothing capacitor 23 of a capacity practically moderate enough not to increase an outer shape of the converter means.

The inverter means 3 is furnished with a function of supplying power to an AC motor 4 by converting a DC voltage to an AC voltage, which is a variable voltage at a variable frequency (VV/VF), by means of an inverter main circuit 31 made up of semiconductor switching elements.

Current detection means 33 for detecting inverter current values iu, iv, and iw outputted from the inverter means 3 and voltage detection means 32 for detecting a DC voltage value EFC outputted from the converter means 2 output, respectively, the inverter current values iu, iv, and iw and the DC voltage value EFC to inverter control means 100. The inverter control means 100 is furnished with a function of controlling a switching operation of the inverter main circuit 31 by outputting a voltage command Vref corresponding to a torque command Tref for the motor 4 to the inverter means 3 so that an output torque of the AC motor 4 follows up the torque command. The first embodiment shows a case where an induction motor is used as the AC motor 4 and a detailed description will be given in the following.

The inverter control means 100 is formed of current command value generation means 101 for calculating current command values id_ref and iq_ref from the torque command value Tref, frequency command value generation means 103 for determining a frequency command value winv from the current command values id_ref and iq_ref and a rotational speed of the motor 4, wm, phase angle command calculation means 104 for calculating a phase angle command θ by integrating the frequency command value winv, coordinate conversion means 105 for converting the inverter currents iu, iv, and iw to a DC amount by coordinate conversion according to the phase angle command θ and outputting the conversion result, and voltage command value generation means 102 for generating a voltage command value Vref on the basis of the current command values id_ref and iq_ref, the frequency command value winv, and the phase angle command value θ and outputting a switching command signal for the inverter main circuit 31. An output torque of the AC motor 4 is basically controlled so as to follow up the torque command value Tref by these means 101 through 105.

The current command value generation means 101 for calculating the current command values id_ref and iq_ref from the torque command value Tref and the coordinate conversion means 105 for converting the inverter currents iu, iv, and iw to DC means by coordinate conversion manage, respectively, the current command values and a motor current after the coordinate conversion in the form of DC signals by a control method so-called the vector control. Output currents iu, iv, and iw of the inverter means 3 obtained by the current detection means 33 are AC signals, which are subjected to conversion processing and converted to dq-axis coordinates by the coordinate conversion means 105, whereas the current signals id and iq are DC signals.

Generally, a d-axis current becomes a flux component current corresponding to an amount of flux and a q-axis current becomes a torque component current corresponding to a torque. The current command value generation means 101 generates a flux component current command value id_ref and a torque component current command value iq_ref according to the torque command and a circuit constant of the AC motor. Also, the frequency command generation means 103 generates the frequency command of the inverter means 3, winv, from a speed signal of the AC motor 4, wm, obtained by speed detection means 5. In a case where an induction motor is used as the AC motor 4, the frequency command winv is generated by calculating slip from the current command values id_ref and iq_ref and adding the speed signal wm to the slip. A command value Vref of an AC voltage the inverter means 3 is supposed to output is generated in the voltage command value generation means 102 using the current command values id_ref and iq_ref and the frequency command value winv obtained in the manner descried above as well as the circuit constant of the AC motor. It is recommendable to refer to NPL 1 for further detail.

On the other hand, in a motor driving power converter particularly in a rail vehicle, an electric car, a hybrid car, and the like, there are some cases where so-called one-pulse control is performed, by which switching takes place only once in every 180-degree electric angle for an output AC voltage of the inverter means 3 with the aim of increasing an output voltage amplitude of the inverter means 3 and reducing a semiconductor switching loss. In this case, the voltage amplitude is determined by only a DC voltage value of an output of the converter means 2 and set as a fixed value. In other words, it is impossible to use a technique of adjusting an output voltage amplitude of the inverter means 3 by a PI controller using a current control error as an input. Instead, the torque is controlled by adjusting only a frequency or a phase angle of output AC of the inverter means 3. To this end, the voltage command value generation means 102 is operated so as to output a voltage command value after upper limit value setting processing is applied to an amplitude value of the voltage to be applied the motor or the current command value generation means 101 and the voltage command value generation means 102 are operated in cooperation. The control method by fixing the voltage amplitude is also already a known technique (see PTL 4 and PTL 5). It should be noted, however, that the invention exerts particularly noticeable effects when applied to the field specified therein.

As are described in PTL 1 through PTL 3, the DC voltage EFC supplied to the inverter means 3 is superimposed with a pulsation twice the frequency of a single-phase AC voltage (hereinafter, this frequency is referred to as the 2f frequency of the single-phase power supply) due to rectification of single-phase AC by the converter means 2. Under the condition that the frequency of an AC voltage outputted from the inverter means 3 reaches the vicinity of 2f of the single-phase power supply, a beat occurs in an output current of the inverter 3. First compensation means 110 and second compensation means 111 are provided with the purpose of suppressing this beat effectively.

A configuration and a function of the first compensation means 110 are basically the same as those in PTL 1 and PTL 2. The DC voltage EFC detected by the voltage detection means 32 is superimposed with a pulsation of a 2f frequency component of the single-phase power supply. The first compensation means 110 extracts a pulsation signal by means of a built-in filter that extracts the 2f frequency component of the single-phase power supply, and superimposes a value found by applying gain processing to the extracted pulsation signal on an output of the frequency command value generation means 103. Through this operation, a beat in an output of the inverter means 3 is suppressed by making compensation in the vicinity of the 2f frequency of the single-phase power supply. Alternatively, instead of extracting the 2f frequency component of the single-phase power supply from the DC voltage, the 2f frequency component of the single-phase power supply may be extracted from an output current of the inverter means 3 (see PTL 3).

On the other hand, in a case where a capacity of the smoothing capacitor 23 is small or electric responsiveness of the AC motor 4 is low due to a small circuit constant, the beat amplitude is increased and a sufficient beat suppression effect may not be obtained by the first compensation means 110 alone. An example of low electric responsiveness of the AC motor 4 is a case where the motor is designed for a larger capacity. In order to suppress an increase of a copper loss in the AC motor with an increasing current, it is necessary to design the motor to have a lower resistance value. Hence there is a tendency that the AC motor has characteristics that electric responsiveness is low and convergence of electric vibration is slow.

Another example of low electric responsiveness is a totally-enclosed structure of a railway motor. This structure is advantageous in that the rotor can be cooled without depending on air ventilation from the outside and that the hermetic structure can prevent entrance of dust and eliminates the need of cleaning and maintenance. This structure, however, is often designed with a smaller resistance value with the purpose of lessening a loss occurring inside the motor in order to achieve the cooling by this structure. Hence, there is a tendency that electric responsiveness becomes further lower. This tendency eventually increases the beat amplitude and may become a factor that makes it impossible to obtain the beat suppression effect by the first compensation means 110. Hereinafter, technical problems in controlling an increase of the beat amplitude will be described more in detail.

Figure 2:
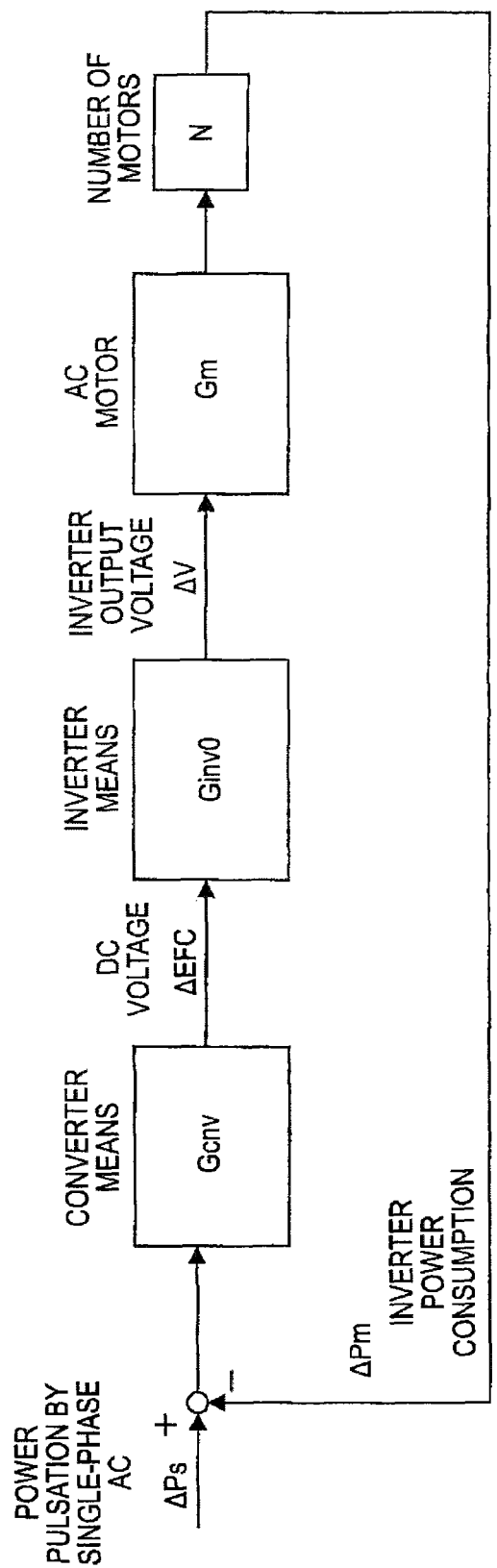
FIG. 2 is a loop diagram of a circuit system in the absence of first and second compensation means of FIG. 1, showing respective state quantities of converter means, inverter means, an AC motor, and inverter control means represented as transmission inputs and outputs.

Firstly, a description will be given to transmission characteristics while the converter means 2, the inverter means 3, the AC motor 4, and the inverter control means 100 are in a steady operation state in the absence of the first and second compensation means. FIG. 2 shows the system of FIG. 1 represented by transmission inputs and outputs of respective state quantities. The respective inputs and outputs of a steady state quantity are omitted and only those of pulsation and variation are shown.

Herein, ΔPs represents a power pulsation resulting from a supply of power by single-phase AC and the frequency of the pulsation is twice the frequency of the AC voltage, Descriptions of ΔPs are organized as follows.

Let $|Vs|\cos(wt)$ be an input voltage of single-phase AC, $\cos(a)$ be an input power factor of the single-phase AC, and $|Is|\cos(wt+a)$ be an input current of the AC single phase, then input power Ps is expressed by Equation (1) as follows:

(Math. 1)

$$Ps = |Vs| \cdot \cos(wt) \cdot |Is| \cdot \cos(wt+a) = \frac{|Vs| \cdot |Is|}{2} \cdot (\cos a + \cos(2wt+a)) \quad (1)$$

Hence, a pulsation of power, ΔPs, is expressed as follows:

(Math. 2)

$$\Delta Ps = \frac{|Vs| \cdot |Is|}{2} \cdot \cos(2wt+a) \quad (2)$$

Therefore, ΔPs pulsates in the same amplitude as that of apparent power at twice the single-phase AC frequency w [rad/sec]. When the single-phase AC frequency is 50 Hz, the frequency of ΔPs is 100 Hz. This is a factor responsible for the occurrence of a pulsation at the 2f frequency of the single-phase power supply in a DC voltage.

Let ΔPm be a pulsation of inverter power consumption in consideration of influences of transmission characteristics of the AC motor, Gm. Then, influences of both ΔPs and ΔPm appear on the pulsation of the DC voltage, ΔEFC, through the transmission characteristics of the converter means, Gcnv. In a case where the converter means is not provided with any particular pulsation absorption function other than a filter capacitor, the transmission characteristics of the converter means, Gcnv, can be briefly described as below. It should be appreciated, however, that attention is paid only to a frequency band in the vicinity of the 2f frequency of the single-phase power supply herein and a DC voltage control response of the converter means is assumed to be relatively low enough.

(Math. 3)

$$Gcnv = \frac{\Delta EFC}{(\Delta Ps - \Delta Pm)} \approx \frac{1}{EFC0 \cdot C \cdot s} \quad (3)$$

where EFC0 is a value of the DC voltage at an operating point, C is a capacity of the smoothing capacitor, and s is a Laplace operation value. Herein, Gcnv shows attenuation characteristics from a power pulsation to a DC voltage pulsation whereas the magnitude (gain) of Gcnv decreases as the capacity of the smoothing capacitor, C, increases. Hence, the pulsation suppression effect can be obtained.

However, a physical outer shape and a weight of the smoothing capacitor increase with an increase of a capacity of the capacitor, C. It is therefore general to determine the capacitor capacity C to allow for a pulsation amplitude of the DC voltage of about 5 to 10% of the DC voltage steady value EFC0.

Hence, as has been already described, a beat occurs in an output current of the inverter means due to influences of the remaining DC voltage pulsation. A method of suppressing such a beat by a control circuit has been adopted extensively and the invention falls within the same category.

The transmission characteristics of the inverter means, Ginv, and the characteristics of the AC motor, Gm, will now be described. For ease of analysis representation in the latter stage, representations used herein are those on a rotational dq-axis coordinates using a rotational flux of the motor as the reference axis. By using the flux axis as the d-axis and the axis orthogonal to the flux axis as the q-axis and describing all of a voltage and a current of the AC motor and so on as a DC amount on the dq axes, a pulsation of power can be described more easily. The transmission characteristics of the inverter means, Ginv0, are defined from an input and an output as follows.

(Math. 4)

$$\begin{bmatrix} \Delta vd \\ \Delta vq \end{bmatrix} = Ginv0 \cdot \Delta EFC = \begin{bmatrix} vd0/EFC0 \\ vq0/EFC0 \end{bmatrix} \cdot \Delta EFC \quad (4)$$

where vd and vq are components of the respective axes when an AC voltage outputted from the inverter means and applied to the AC motor are expressed on the dq-axis coordinates, vd0 and vq0 are values at a steady operating point, and Δvd and Δvq are pulsation components of vd and vq resulting from application of a pulsation of a DC voltage, ΔEFC. In other words, Equation (4) above gives a definition on the assumption that Δvd and Δvq occur in proportion to ΔEFC while keeping a ratio of vd0 and vq0 on the condition that no particular compensation is provided in the inverter control means.

Also, the transmission characteristics of the AC motor, Gm, are defined from an input and an output as follows.

(Math. 5)

$$\Delta Pm = N \cdot Gm \cdot \begin{bmatrix} \Delta vd \\ \Delta vq \end{bmatrix} \quad (5)$$

where N is the number of motors connected per converter means, ΔPm is a pulsation of overall power consumption by the inverter means. The equation represents a relation that the pulsations Δvd and Δvq of the output voltage outputted from the inverter means are received through the characteristics of the motor, so that a pulsation of the power consumption, ΔPm, is generated at a DC input portion of the inverter.

Figure 3A:
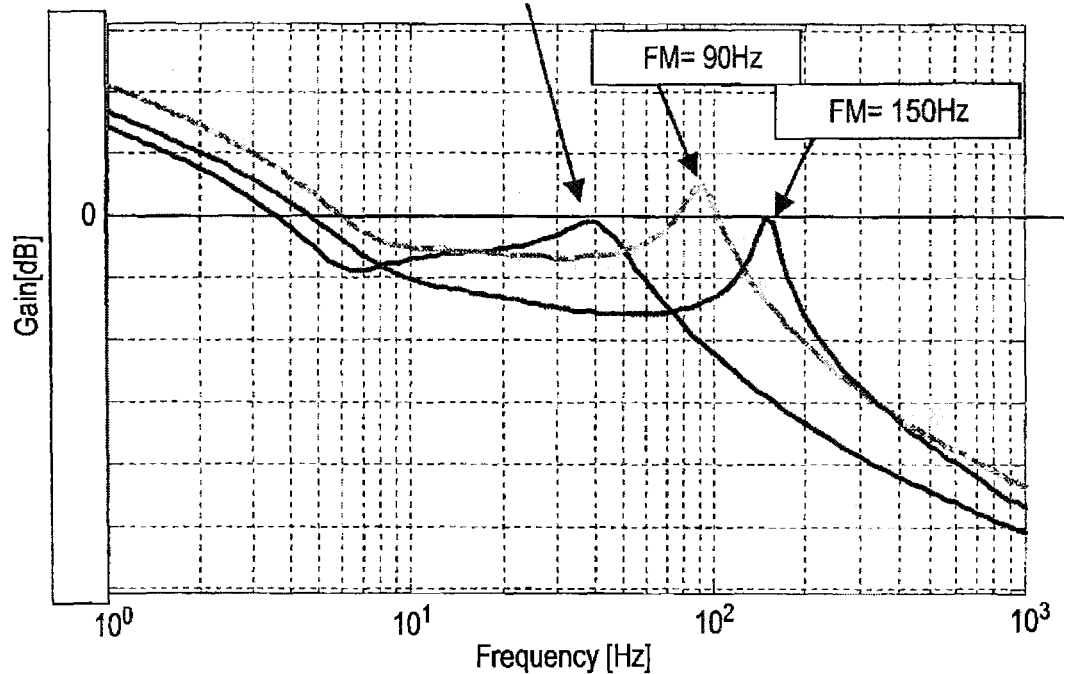
FIG. 3 is a Bode diagram showing open loop transmission characteristics formed of the converter means, the inverter means, a normal AC motor, and the inverter control means in the loop diagram of FIG. 2.
Figure 3B:
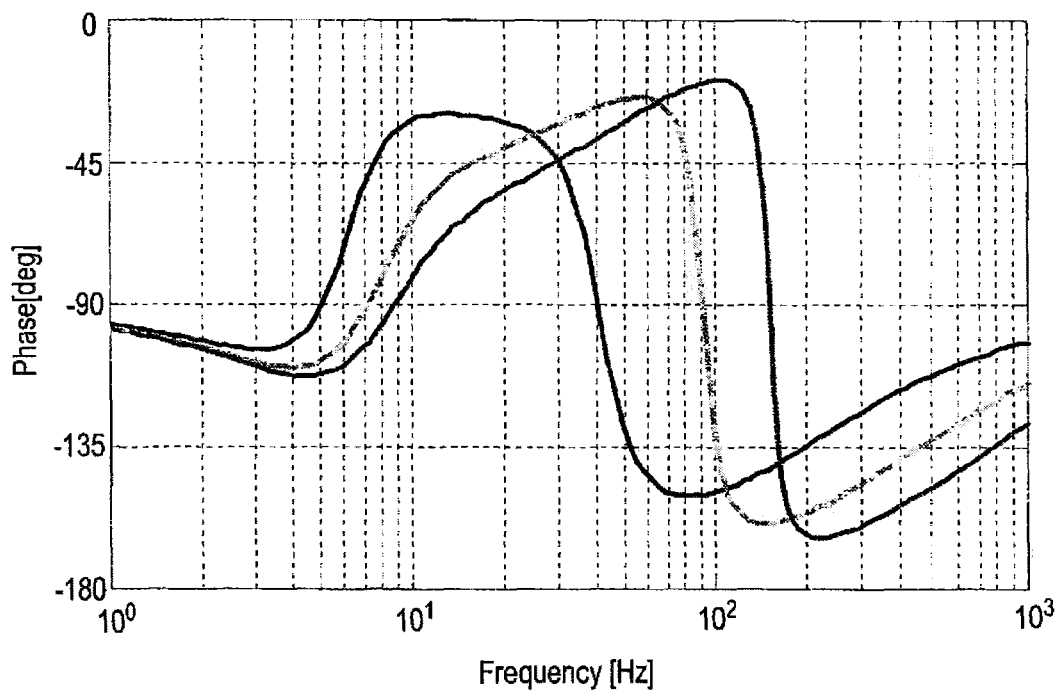
Figure 4A:
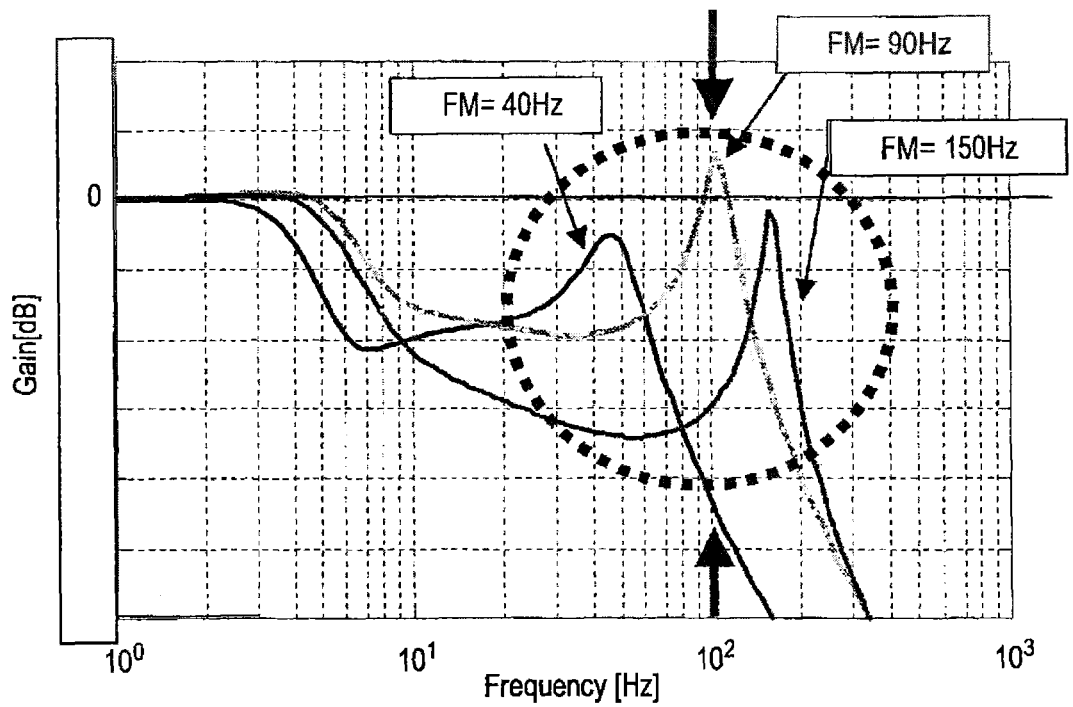
FIG. 4 is a Bode diagram showing closed loop transmission characteristics formed of the converter means, the inverter means, a normal AC motor, and the inverter control means in the loop diagram of FIG. 2.
Figure 4B:
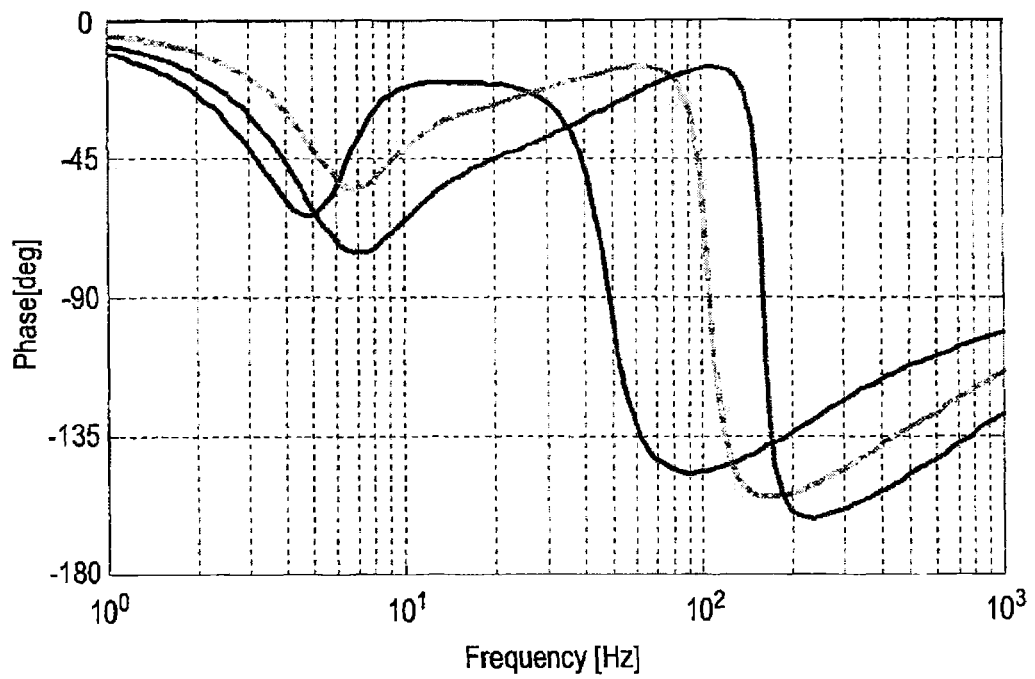

FIG. 3 shows an example of a Bode diagram showing the characteristics Gm*Ginv0*Gcnv, which are the above-described transmission characteristics connected in series, that open loop transmission characteristics in the loop shown in FIG. 2. Also, FIG. 4 shows an example of a Bode diagram of the closed loop transmission characteristics. Various constants and operation conditions used for these examples are as follows.

(Constants and operation conditions used for analysis in FIG. 3 through FIG. 5)
 capacity of smoothing capacitor: 6 mF
 voltage of smoothing capacitor: 3000 V
 circuit constant of motor: standard value of a 300-kw-class motor
 motor rotational frequency conditions: 40, 90, and 150 Hz (electric angle)

Figure 5A:
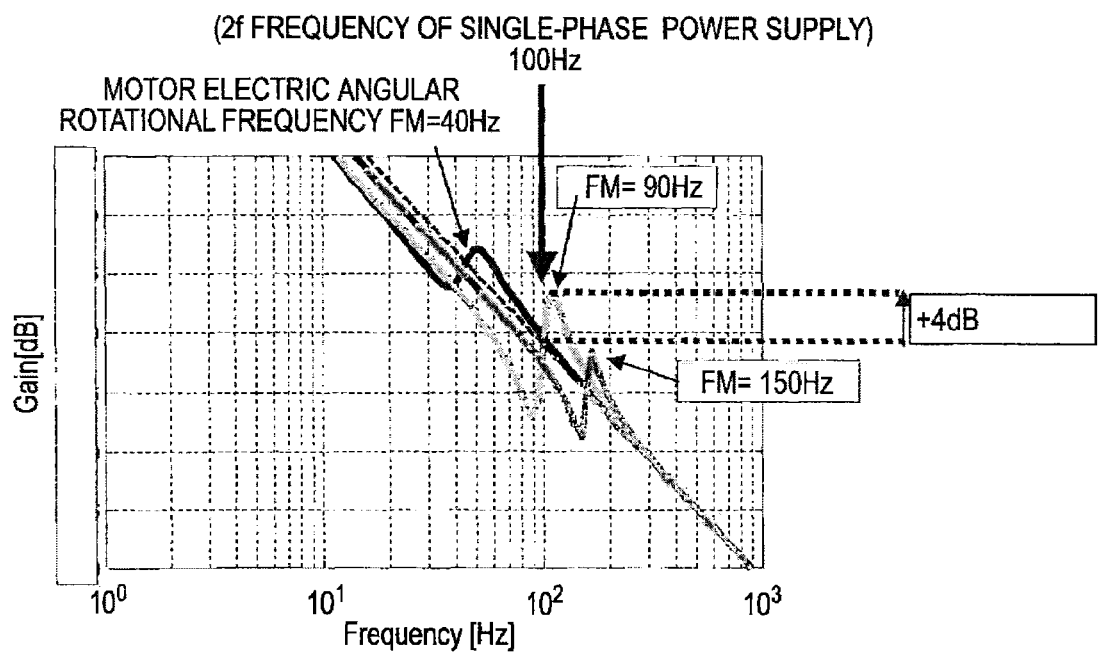
FIG. 5 is a Bode diagram showing closed loop transmission characteristics of a single-phase AC input from a power pulsation to a smoothing capacitor voltage in the absence of the first and second compensation means.
Figure 5B:
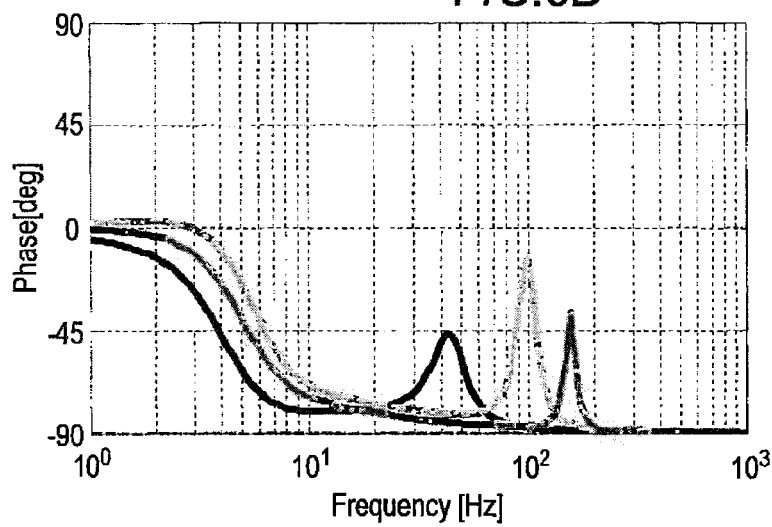

In the Bode diagrams of FIG. 3 through FIG. 5, the top row shows gain characteristics and the bottom row shows phase characteristics, and the abscissa is used for frequencies. Three characteristic lines corresponding to three motor rotational frequency conditions (40, 90 and 150 Hz) are placed on one diagram. Basically, fundamental characteristics are such that a gain decreases at high frequencies due to the characteristics of the converter means, Gcnv, by the smoothing capacitor and expressed by Equation (3) above, and resonance characteristics in the vicinity of the motor rotational frequency contained in the transmission characteristics of the motor, Gm, are superimposed. The resonance points move with a change of the motor rotational frequency. The DC voltage control response of the converter means is assumed to be relatively low enough and therefore disregarded in the definition of Gcnv. Hence, evaluation accuracy in a low frequency region is not obtained from FIG. 3. Nevertheless, FIG. 3 is a useful Bode diagram in a region in the vicinity of the 2f frequency of the single-phase power supply (for example, 100 Hz or 120 Hz) or higher.

As has been described above, the open loop transmission characteristics Gopen0 of FIG. 3 are defined by Equation (6) below, whereas the closed loop transmission characteristics Gclose0 are defined by Equation (7) below.

(Math. 6)

$$Gopen0 = N \cdot Gm \cdot Ginv0 \cdot Gcnv \quad (6)$$

(Math. 7)

$$\frac{\Delta Pm}{\Delta Ps} = Gclose0 = Gopen0 \cdot (1 + Gopen0)^{-1} \quad (7)$$

Gclose is drawn in FIG. 4. As with FIG. 3, lines corresponding to three different conditions of the motor rotational frequency are placed on one diagram. The resonance point frequencies in the open loop transmission characteristics of FIG. 3 are directly the values of the motor rotational frequencies: 40, 90, and 150 Hz. However, it can be confirmed from FIG. 4 that the resonance points shift to about 45, 100, and 160 Hz by closing the loop. The transmission characteristics of a single-phase AC input from the power pulsation ΔPs to the DC voltage ΔEFC were confirmed by closing the loop as in FIG. 4, the result of which is expressed by Equation (8) below and shown in FIG. 5.

(Math. 8)

$$\frac{\Delta EFC}{\Delta Ps} = Gcnv \cdot (1 + Gopen)^{-1} \quad (8)$$

The transmission characteristics of the converter means, Gcnv, expressed by Equation (3) above are placed on FIG. 5 by a dotted line for reference. As with FIG. 4, FIG. 5 shows the transmission characteristics from ΔPs to ΔEFC under the three conditions of the motor rotational frequency: 40, 90, and 150 Hz. It is understood that the resonance characteristics shifted to about 45, 100, and 160 Hz due to influences of closing the loop also appear. For these transmission characteristics, a pulsation twice the frequency of the power supply, that is, 100 Hz in the case of a 50-Hz power supply, is applied as the power pulsation ΔPs of the single-phase AC input. In a case where the value of the motor rotational frequency is slightly lower than 100 Hz (for example, 90 Hz) due to a shifting situation of the resonance characteristics of FIG. 5, the resonance frequency becomes 100 Hz and ΔPs is amplified. It should be noted, however, that this amplification under the constant condition of FIG. 5 is about +4 dB (1.6 times) from the characteristics of the converter (smoothing capacitor) alone. Hence, the beatless control is sufficiently feasible by the first compensation means 110, which is the method in the related art.

Figure 6A:
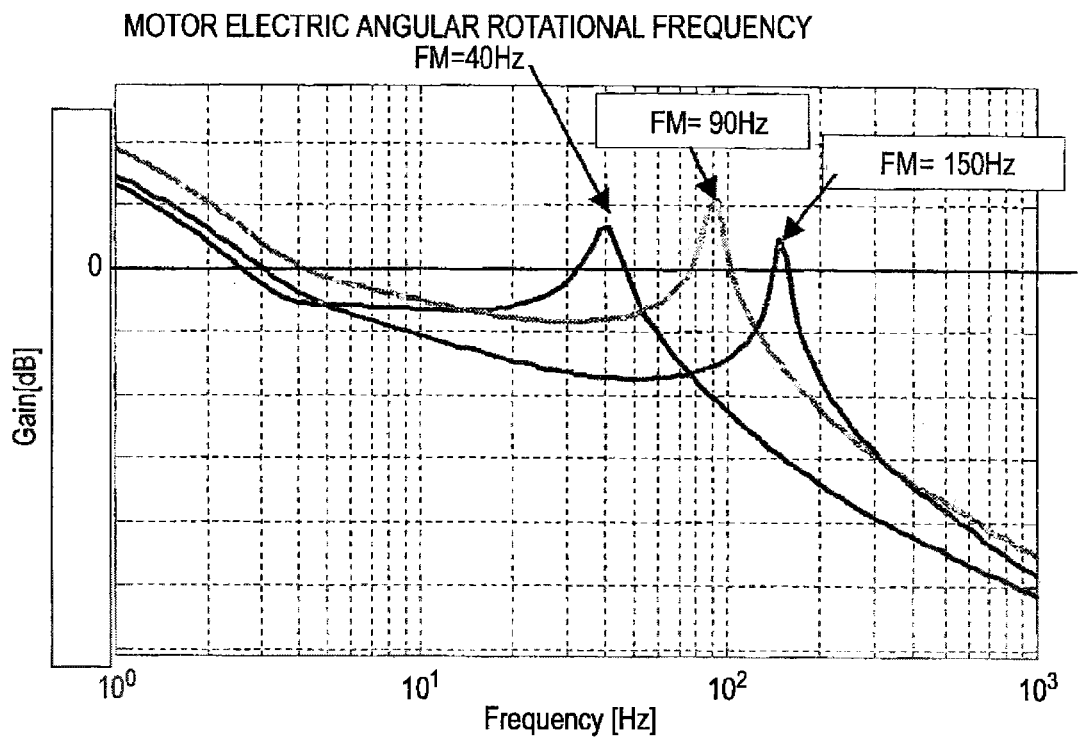
FIG. 6 is a Bode diagram showing open loop transmission characteristics in a case where a low-resistance motor is used in the absence of the first and second compensation means.
Figure 6B:
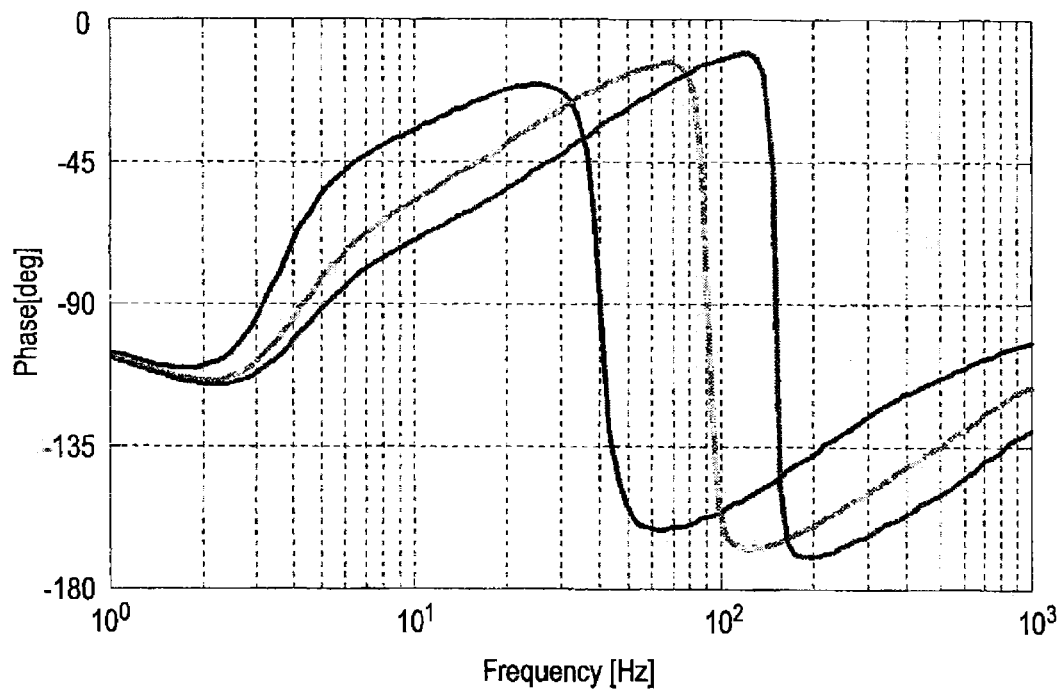
Figure 7A:
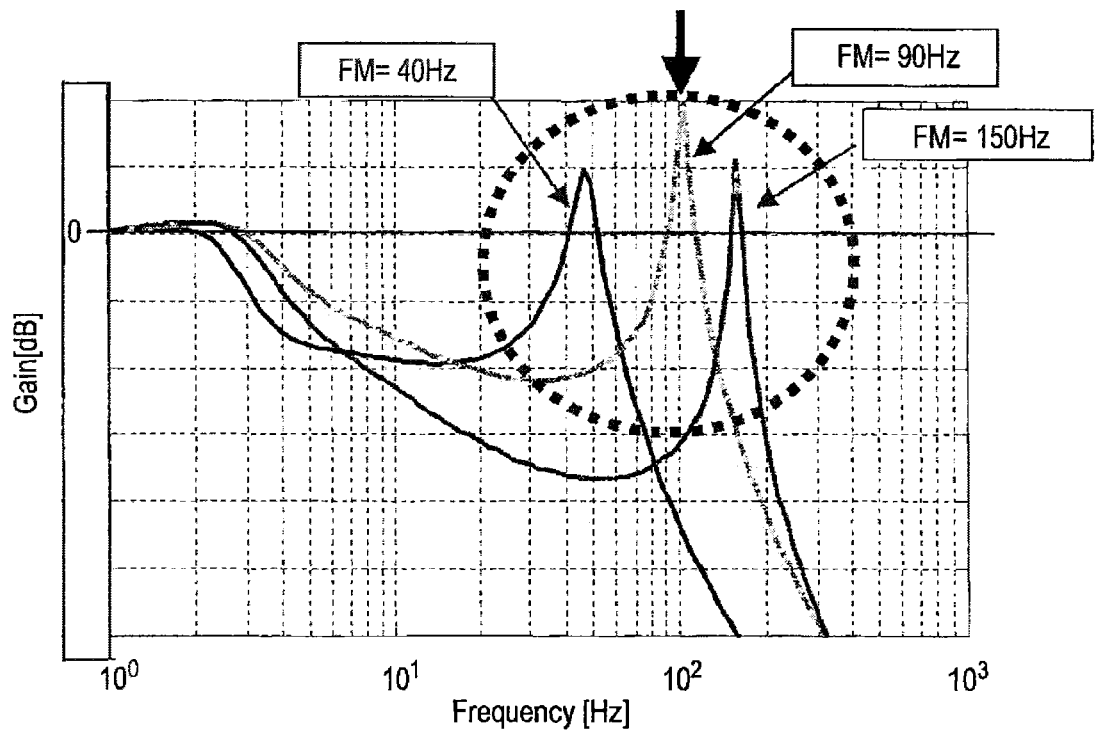
FIG. 7 is a Bode diagram showing closed loop transmission characteristics in a case where a low-resistance motor is used in the absence of the first and second compensation means.
Figure 7B:
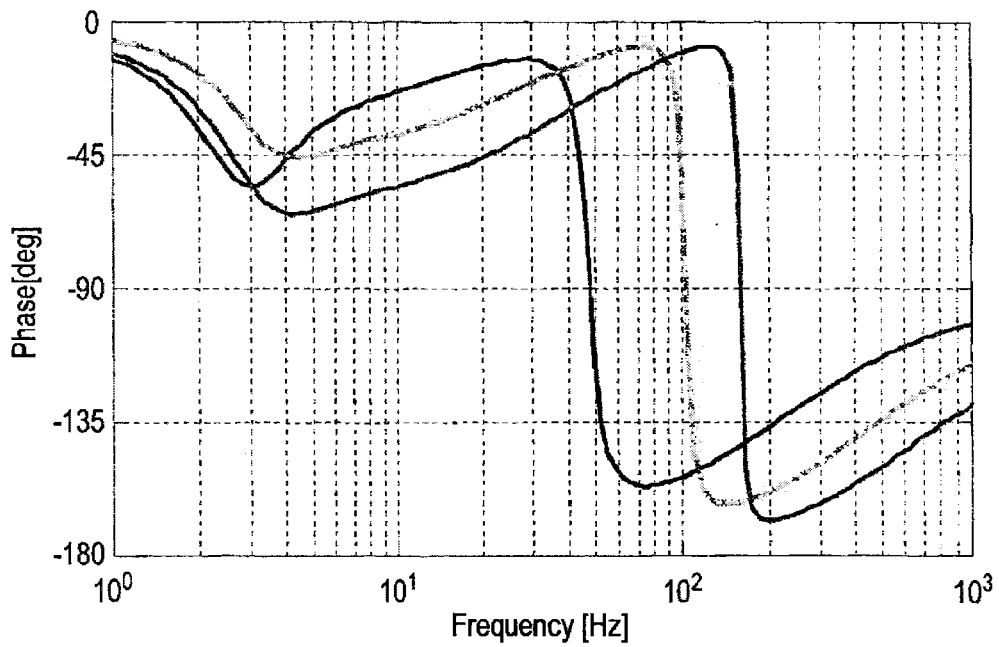
Figure 8A:
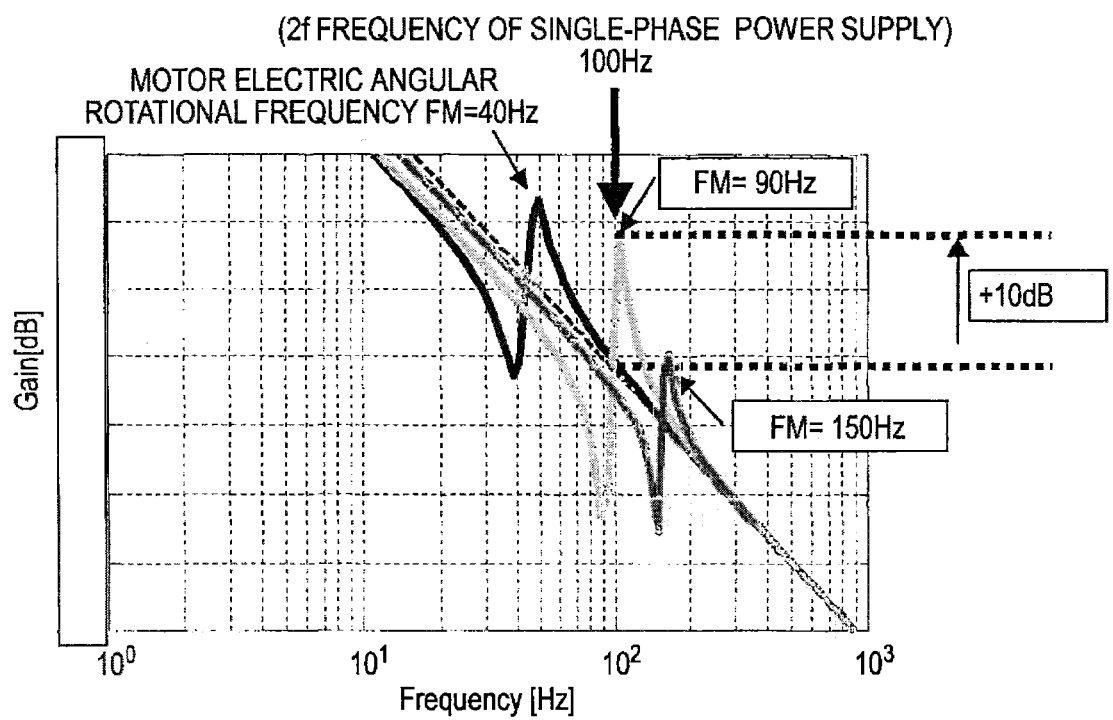
FIG. 8 is a Bode diagram showing closed loop transmission characteristics of a single-phase AC input from a power pulsation to a smoothing capacitor voltage in a low-resistance motor in the absence of the first and second compensation means.
Figure 8B:
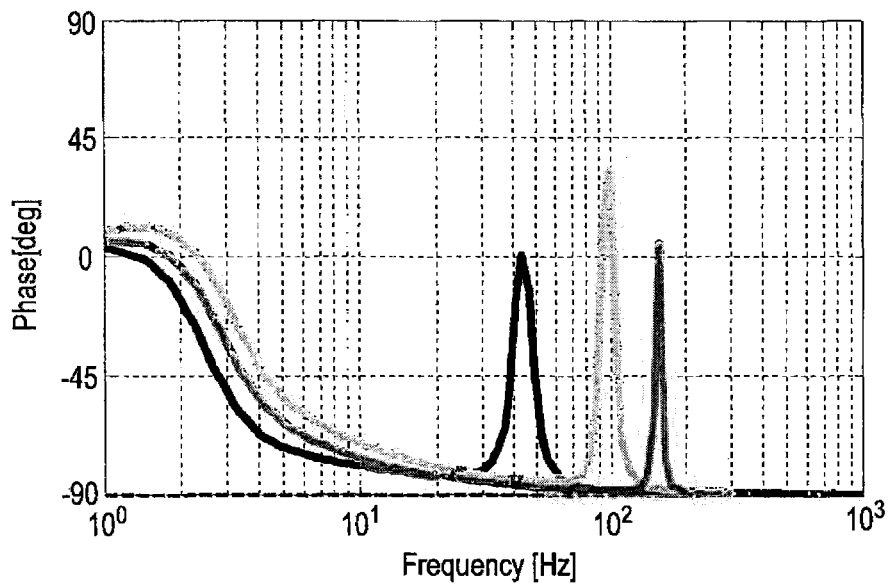

The open loop transmission characteristics and the closed loop transmission characteristics of FIG. 3 through FIG. 5 are drawn again by changing a circuit constant of the motor to the one for a larger capacity and hence lower resistance in FIG. 6 (open loop transmission characteristics) and FIGS. 7 and 8 (closed loop transmission characteristics).

From a comparison between FIG. 4 showing the characteristics with a standard motor constant and FIG. 6 showing the characteristics with a constant for a large capacitor, it is understood that the resonance characteristics resulting from the motor rotational frequency are more noticeable in FIG. 6. In particular, when a comparison is made in a case where the pulsation frequency of 100 Hz of power disturbance ΔPs and the motor rotational frequency come close to each other, it is understood that influences of the resonance characteristics are more significant in FIG. 6 than in FIG. 4 and a pulsation of the pulsation of the inverter power consumption, ΔPm, is amplified by the circuit constant condition of the motor.

In particular, when a comparison is made in a case where the motor rotational frequency is 90 Hz, which becomes the condition that amplifies the pulsation frequency of 100 Hz of power disturbance ΔPs, the resonance characteristics are more noticeable in FIG. 8 that in FIG. 5 and the amplification is + about 10 dB (about 3.2 times) from the characteristics of the converter (smoothing capacitor) alone. As has been described, in a case where the circuit constant of the motor is the one for the characteristics of a small loss and low resistance, there is a case where the resonance characteristics become more significant due to the impedance characteristics of the motor and the pulsation of the DC voltage, ΔEFC, becomes larger. When the DC voltage pulsation ΔEFC becomes too large, there is a possibility that the DC voltage pulsation ΔEFC exceeds a compensation limit amount of the first compensation means 110, in which case the beatless control may possibly become difficult by the first compensation means 110 alone.

Contrarily to the foregoing, the second compensation means 111 is provided with the purpose of easing the resonance characteristics by improving responsiveness of the overall system formed of the converter means 2, the inverter means 3, and the AC motor 4 not only in the 2f frequency band of the single-phase power supply but also in the other frequency bands. The effect thereof will be described in the following.

At least one of current signals id and iq in the latter stage, which are obtained by converting the output currents iu, iv, and iw of the inverter means 3 obtained by the current detection means 33 to dq-axis coordinates by the coordinate conversion means 105, is inputted into the second compensation means 111.

A calculation content of the coordinate conversion means 105 is expressed by an equation as follows.

(Math. 9)

$$\begin{bmatrix} id \\ iq \end{bmatrix} = \sqrt{\frac{2}{3}} \cdot \begin{bmatrix} \cos\theta & \sin\theta \\ -\sin\theta & \cos\theta \end{bmatrix} \cdot \begin{bmatrix} 1 & -1/2 & -1/2 \\ 0 & \sqrt{3}/2 & -\sqrt{3}/2 \end{bmatrix} \cdot \begin{bmatrix} iu \\ iv \\ iw \end{bmatrix} \quad (9)$$

The second compensation means 111 performs frequency processing that cuts off a low-frequency region and doubles the gain. The transmission characteristics of this processing, Gcp_1, are expressed by Equation (10) and shown in FIG. 10.

(Math. 10)

$$\Delta winv = Gcp\_1 \cdot iq = Kcp \cdot \frac{s}{s + \omega h} \cdot iq \quad (10)$$

where ωh is a lower cut-off frequency [rad/sec], s is a Laplace operator, and Kcp a compensation gain. Also, iq is a q-axis current, which is a component of the inverter output current contributing to a torque, calculated in accordance with Equation (8) above. Also, compensation is made by adding Δwinv calculated in accordance with Equation (9) above as a compensation amount to a frequency command value, which is an output of the frequency command value generation means 103.

Figure 9:
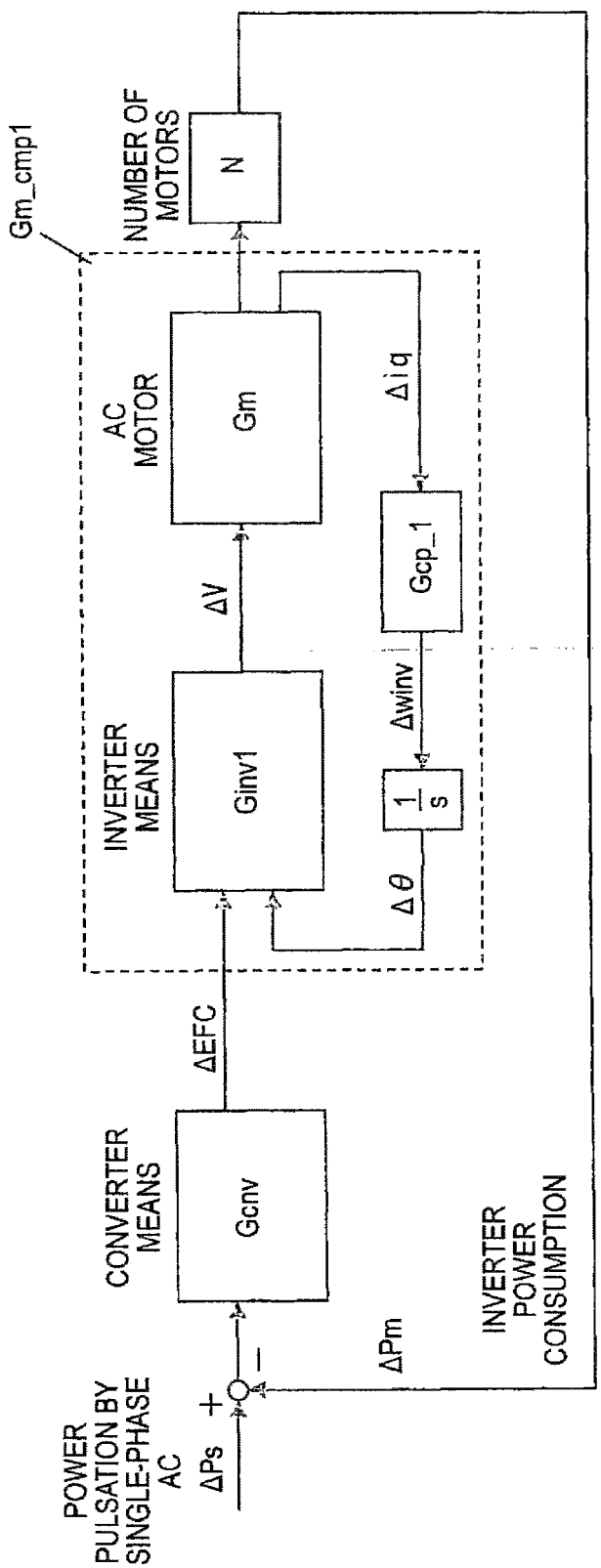
FIG. 9 is a loop diagram showing respective state quantities of the converter means, the inverter means, an AC motor, and the inverter control means represented as transmission inputs and outputs in a case where the second compensation means is additionally provided in FIG. 1.

The second compensation means 111 of the first embodiment operates the power consumption characteristics of the AC motor by compensating for the frequency command value after a torque component of an AC current outputted from the inverter means 3 to the AC motor 4 is extracted and a pulsation in a high frequency band including the 2f frequency of the single-phase power supply is extracted. Physically, a pulsation of a torque component of an AC current is a pulsation of effective power and a frequency operation by the inverter is an operation on a torque, and hence, on the effective power. Accordingly, by operating a frequency command value by the inverter on the basis of an extraction result of a pulsation of a torque component of the AC current in a direction to cancel out the pulsation, a function of suppressing a pulsation of power can be provided. Hence, an operation to suppress the pulsation of the DC voltage, ΔEFC, becomes feasible. FIG. 9 shows the concept of this compensation processing in a block diagram of transmission characteristics corresponding to FIG. 2. Hereinafter, as has been confirmed in the Bode diagrams of FIG. 3 through FIG. 8 on the basis of the block diagram of FIG. 2, the transmission characteristics will now be described in the same manner with reference to FIG. 9 in a case where the second compensation means 111 is additionally provided.

As has been described with reference to FIG. 1, the frequency command value is integrated and become a phase angle command. Hence, a compensation amount for the frequency command calculated in accordance with Equation (9) above can be understood also as a compensation amount for a phase angle for the AC motor, (Math. 11)

$$\Delta\theta = \frac{1}{s} \cdot \Delta winv = \frac{1}{s} \cdot Gcp\_1 \cdot iq = Kcp \cdot \frac{1}{s + \omega h} \cdot iq \quad (11)$$

To compensate for the phase angle means to compensate for an output voltage phase of the inverter means, Herein, let Δvd2 and Δvq2 be compensations for an output voltage by the second compensation means 111 and assume that Δθ is minute. Then, we obtain (Math. 12)

$$\begin{bmatrix} vd0 + \Delta vd2 \\ vq0 + \Delta vq2 \end{bmatrix} = \begin{bmatrix} \cos\Delta\theta & -\sin\Delta\theta \\ \sin\Delta\theta & \cos\Delta\theta \end{bmatrix} \cdot \begin{bmatrix} vd0 \\ vq0 \end{bmatrix} \approx \begin{bmatrix} 1 & -\Delta\theta \\ \Delta\theta & 1 \end{bmatrix} \cdot \begin{bmatrix} vd0 \\ vq0 \end{bmatrix} \quad (12)$$

Hence, it can be understood as follows.

(Math. 13)

$$\begin{bmatrix} \Delta vd2 \\ \Delta vq2 \end{bmatrix} \approx \begin{bmatrix} -vq0 \\ vd0 \end{bmatrix} \cdot \Delta\theta \quad (13)$$

Accordingly, the transmission characteristics of the inverter means, Ginv1, in a case where the second compensation means 111 is additionally provided can be expressed by expanding Equation (4) above as transmission characteristics for the inverter output voltage compensation using both of the DC voltage pulsation ΔEFC and a compensation amount for the phase angle, Δθ, as inputs.

(Math. 4)

$$\begin{bmatrix} \Delta vd + \Delta vd2 \\ \Delta vq + \Delta vq2 \end{bmatrix} = Ginv1 \cdot \begin{bmatrix} \Delta EFC \\ \Delta \theta \end{bmatrix} = \begin{bmatrix} vd0/EFC0 & -vq0 \\ vq0/EFC0 & vd0 \end{bmatrix} \cdot \begin{bmatrix} \Delta EFC \\ \Delta \theta \end{bmatrix} \quad (14)$$

Figure 11A:
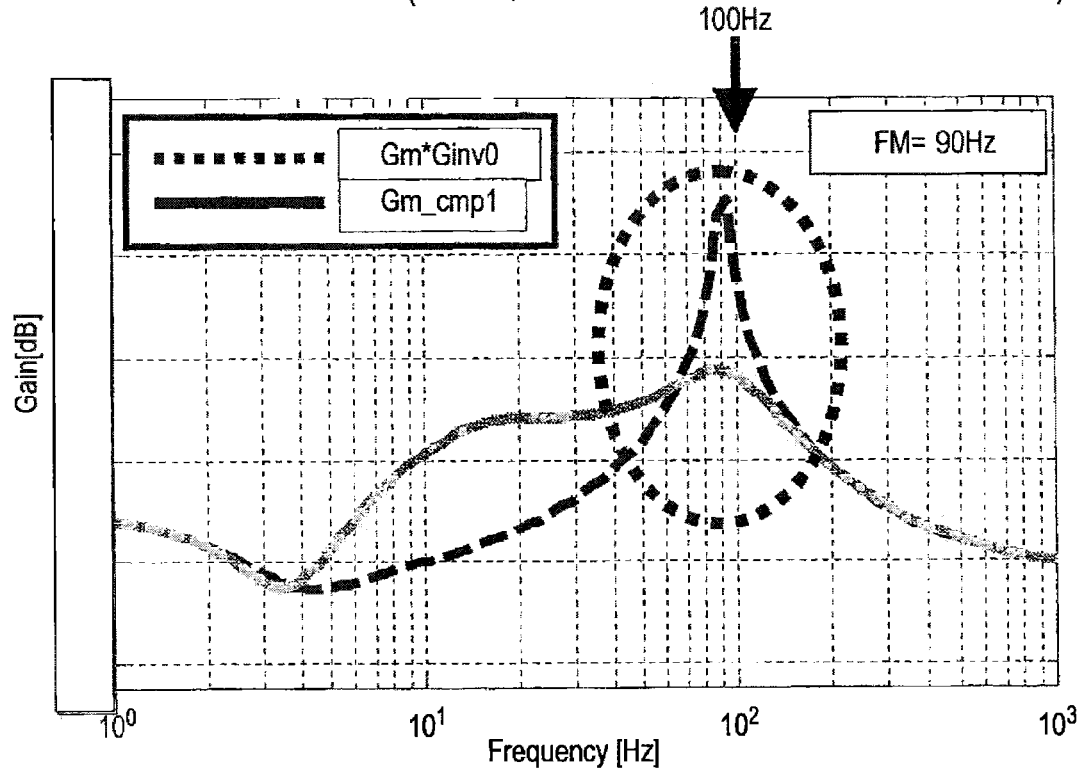
FIG. 11 is a view used to describe an effect of improvements of the transmission characteristics of the inverter means, the AC motor, and the inverter control means by the second compensation means in the first embodiment.
Figure 11B:
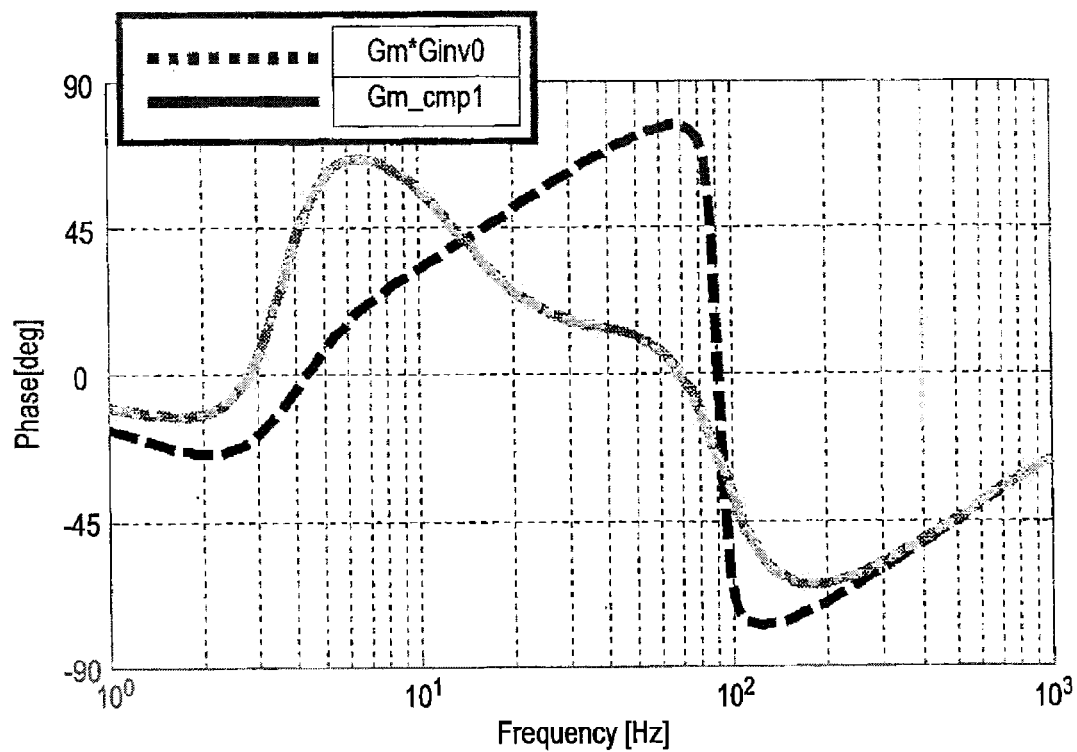

As is indicated by a dotted frame of FIG. 9, Gm_cmp1 is given as transmission characteristics from the DC voltage pulsation ΔEFC to the inverter power consumption pulsation ΔPm in consideration of a compensation effect for the transmission characteristics of the AC motor, Gm, by the transmission characteristics of the inverter means, Ginv1, in Equation (14) above and the transmission characteristics Gcp_1 by the second compensation means 111 in Equations (10) and (11) above. FIG. 11 shows the transmission characteristics Gm_cmp1. For comparison, the transmission characteristics Gm*Ginv0 (Equations (4) and (5)) from the DC voltage pulsation ΔEFC to the inverter power consumption pulsation ΔPm in the absence of the second computation means are also shown.

Figure 10A:
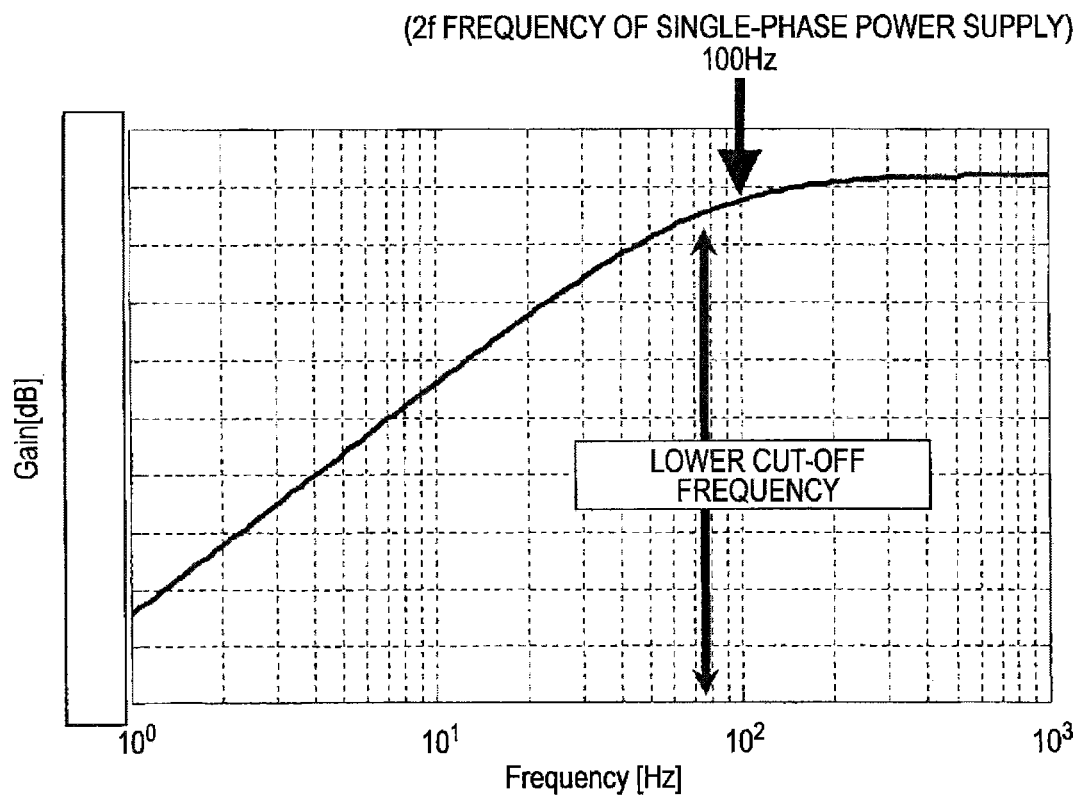
FIG. 10 is a Bode diagram showing input and output transmission characteristics of the second compensation means in the first embodiment.
Figure 10B:
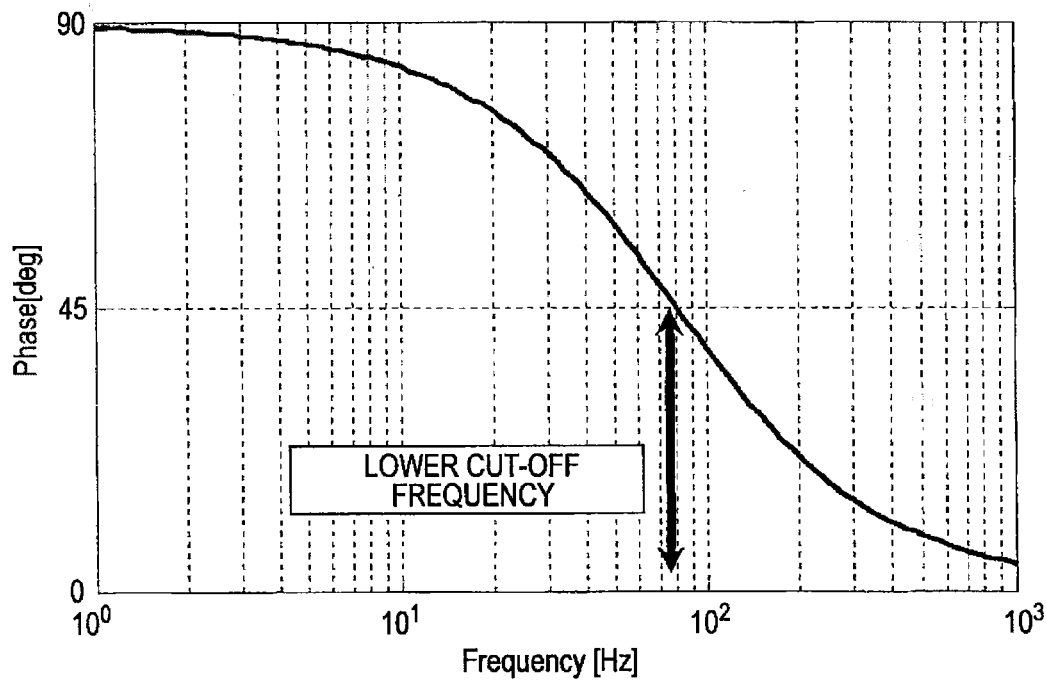

(Constants and operation conditions used for analysis in FIG. 10 and FIG. 11)

second compensation means: lower cut-off frequency ωh in Equation (9) above, herein 500 rad/sec second compensation means: compensation gain Kcp in Equation (9) above, herein 0.15 circuit constant of motor: same as the constant used for a large-capacity motor with low resistance (FIG. 6 through FIG. 8)

motor rotational frequency: 90 Hz (electric angle)

As is shown in FIG. 11, the transmission characteristics of the transmission characteristics Gm*Ginv0 in the absence of the second compensation means have resonance characteristics in the vicinity of the motor rotational frequency. When combined with the transmission characteristics of the converter, Gcnv, expressed by Equation (3) above, the characteristics specified above become a factor that makes the pulsation of the DC voltage, ΔEFC, too large as described with reference to FIG. 8. On the other hand, it can be confirmed with the transmission characteristics Gm_cmp1 in the presence of the second compensation means that the resonance characteristics in the vicinity of the motor rotational frequency are suppressed. It shows that, physically, a pulsation of the torque component of the AC current is extracted and the frequency command value by the inverter is operated in a direction to cancel out the extracted pulsation, so that a pulsation of the torque component of the AC current, and hence the pulsation of the motor output power, ΔPm, is suppressed.

When combined with the conversion characteristics of the converter, Gcnv, it is necessary to appropriately set the lower cut-off frequency wh and the magnitude of the compensation gain Kep in Equation (9) above in avoiding amplification of the power pulsation. In order to describe this point, the open loop transmission characteristics Gopen1 are defined as follows, (Math. 15)

$$Gopen1 = N \cdot Gm\_cmp1 \cdot Gcnv \quad (15)$$

Also, in contrast to the open loop transmission characteristics Gopen1, the closed loop transmission characteristics Gclose1 are defined by Equation (15) as follows.

(Math. 16)

$$\frac{\Delta Pm}{\Delta Ps} = Gclose1 = Gopen1 \cdot (1 + Gopen1)^{-1} \quad (16)$$

Figure 12A:
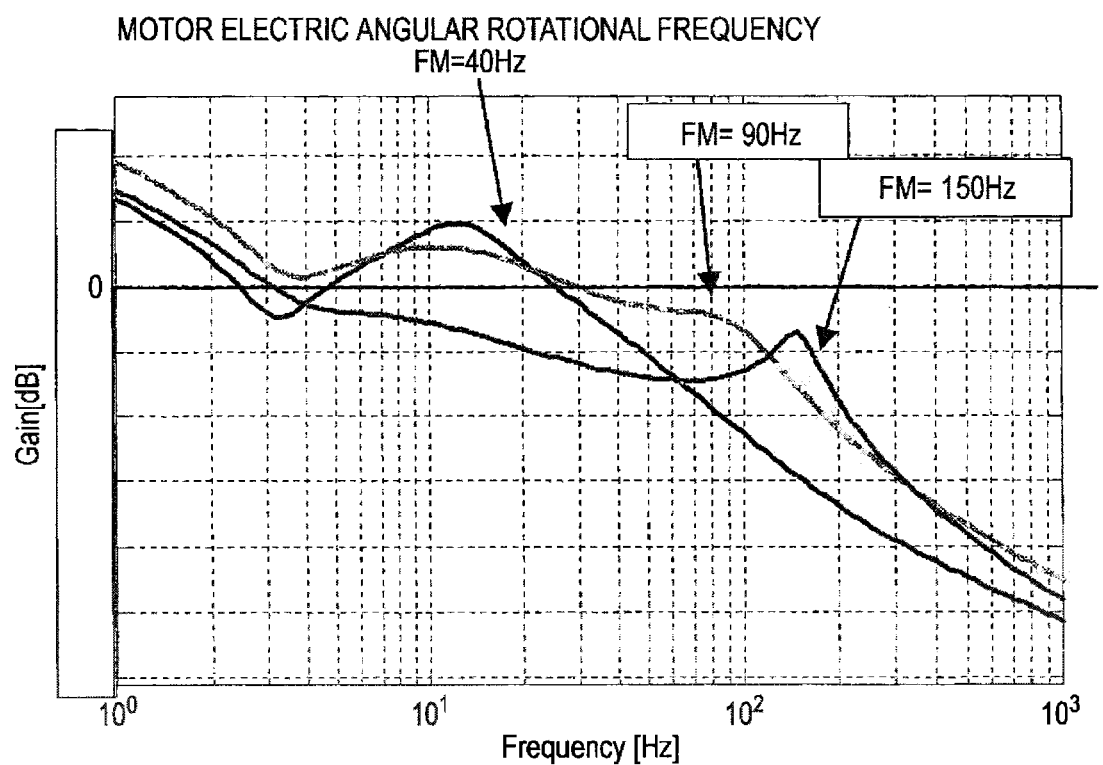
FIG. 12 is a Bode diagram showing open loop transmission characteristics in a case where the second compensation means of the first embodiment is additionally provided to an AC motor with a circuit constant same as the one used in FIG. 6 and FIG. 7.
Figure 12B:
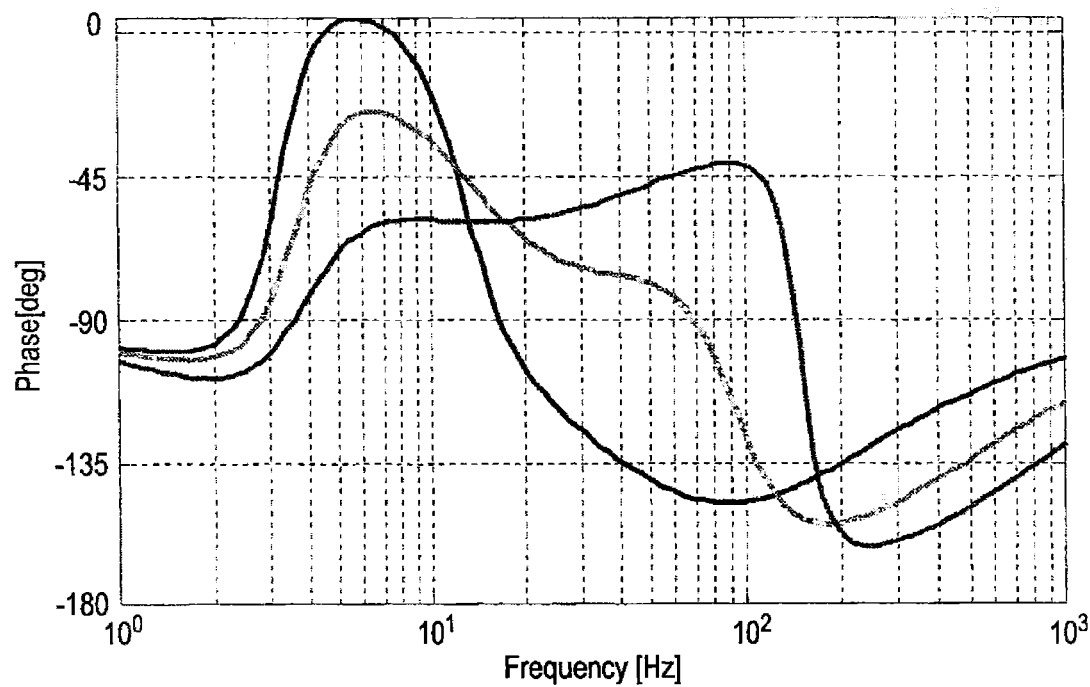
Figure 13A:
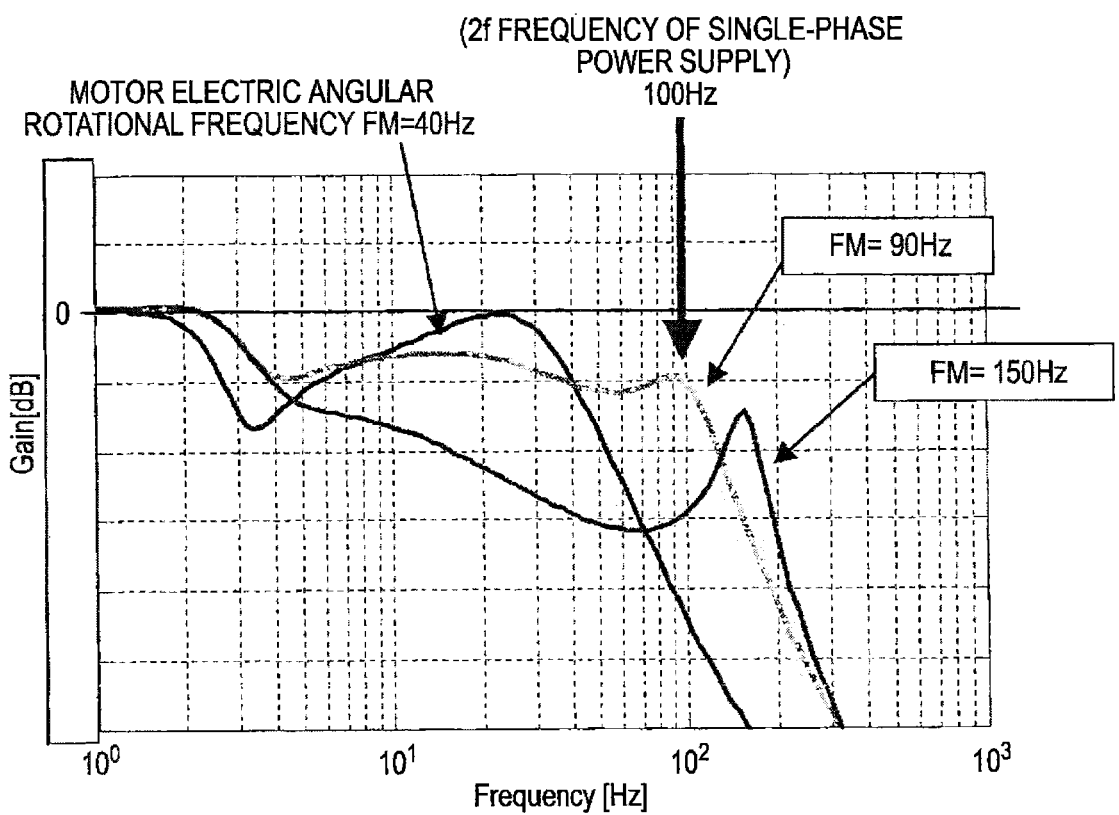
FIG. 13 is a Bode diagram showing closed loop transmission characteristics in a case where the second computation means of the first embodiment is additionally provided to an AC motor with a circuit constant same as the one used in FIG. 6 and FIG. 7.
Figure 13B:
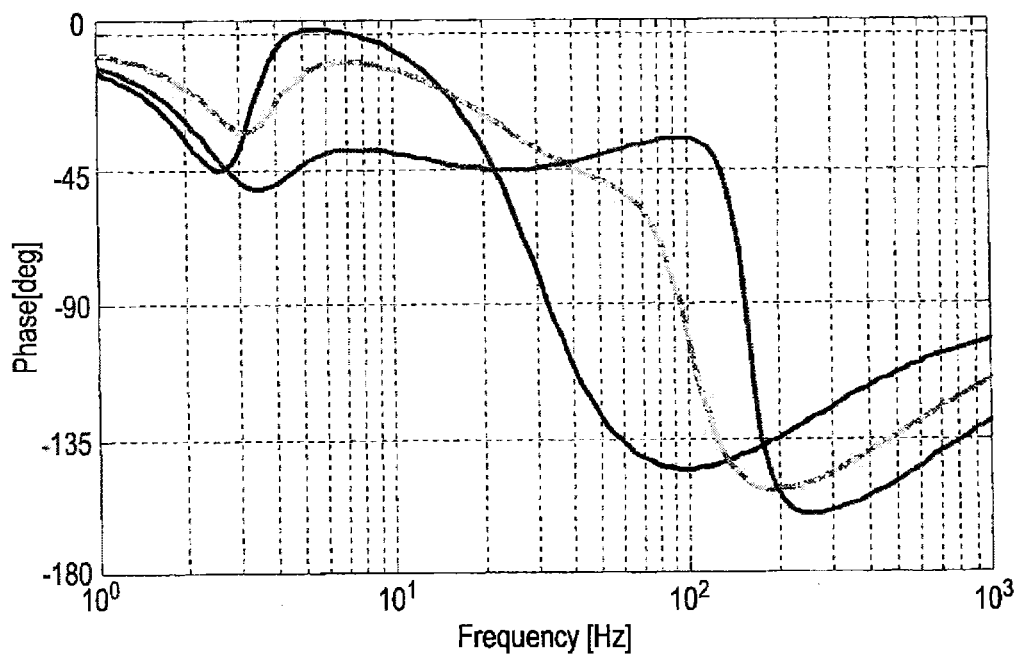
Figure 14A:
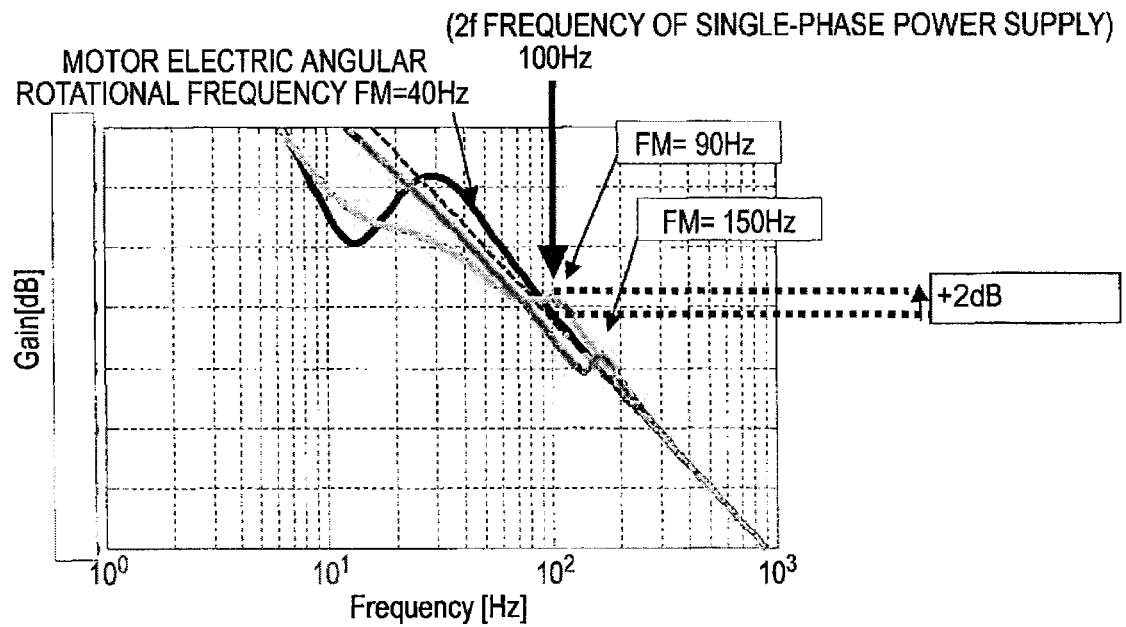
FIG. 14 is a Bode diagram showing closed loop transmission characteristics of a single-phase AC input from a power pulsation to a smoothing capacitor voltage in a case where an AC motor with a circuit constant same as the one used in FIG. 6
Figure 14B:
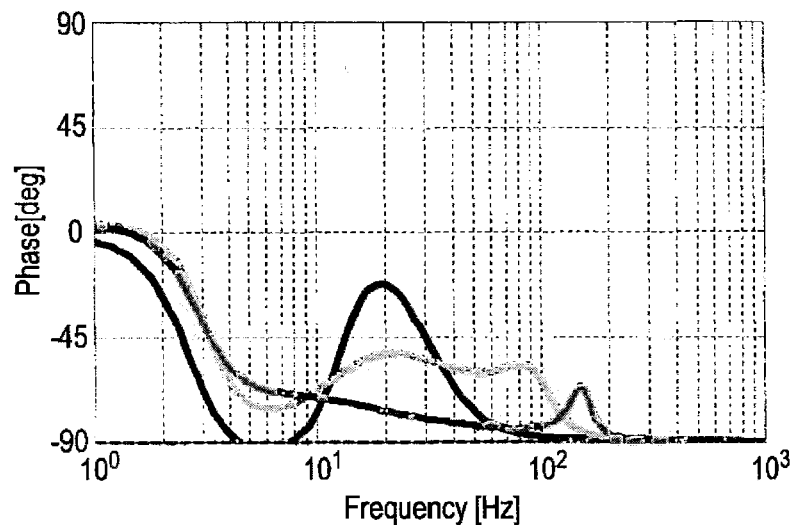

As with the open loop characteristics and the closed loop characteristics shown in FIG. 3 through FIG. 8, the open loop characteristics Gopen1 and the closed loop characteristics Gclose1 when the second compensation means 111 is additionally provided are shown in FIG. 12 through FIG. 14. Constants and operation conditions used for analysis in FIG. 12 through FIG. 14 are as follows.

(Constants and operation conditions used for analysis in FIG. 12 through FIG. 14)

second compensation means: lower cut-off frequency oh in Equation (10) above, herein 500 rad/sec second compensation means: the compensation gain Kcp in Equation (10) above, herein 0.15 capacity of smoothing capacitor: 6 mF (same as in FIG. 3 through FIG. 8)

voltage of smoothing capacitor: 3000 V (same as in FIG. 3 through FIG. 8)

motor rotational frequency conditions: 40, 90, and 150 Hz (electric angles) (same as in FIG. 3 through FIG. 8)

circuit constant of motor: a constant for large-capacity motor with low resistance (same as the constant used in FIG. 6 through FIG. 8)

A comparison is made between FIG. 6 through FIG. 8 showing the characteristic views in a case where the second compensation means 111 is not additionally provided and FIG. 12 through FIG. 14 showing the characteristics views in a case where the second compensation means 111 is additionally provided. As has been already described, in the close loop of FIG. 8, there are the resonance characteristics of the frequency points shifted to frequencies higher than the motor rotational frequency, and the DC voltage pulsation ΔEFC at the 2f frequency of the single-phase power supply is amplified to + about 10 dB (about 3.2 times) due to the characteristics of the converter (smoothing capacitor) alone. Hence, in some cases, the beatless control may be difficult by the first compensation means in the related art alone.

Contrary to the above, the resonance characteristics are eased to + about 2 dB (about 1.3 times) in FIG. 14 due to the characteristics of the converter (smoothing capacitor) alone. It thus becomes possible to secure the beat suppression function by the first compensation means. This is the effect obtained by adequately designing a cut-off frequency and a gain of the second compensation means. More specifically, this is the result obtained by the following. In order to realize the suppression of the resonance characteristics, including influences of the transmission characteristics of the converter, at least in a frequency region in the vicinity of the 2f frequency of the sing-phase power supply in which a pulsation disturbance input of concern becomes noticeable, the lower cut-off frequency wh in the second compensation means is set to the 2f frequency of the single-phase power supply or below (in the case of FIG. 10, 500 rad/sec=79.5 Hz<50 Hz×2), and the compensation gain Kep is set to adequate magnitude so that a gain in the vicinity of the 2f frequency of the single-phase power supply in the characteristic view of FIG. 12 including the converter is 0 dB or below.

In FIG. 10 through FIG. 14, the lower cut-off frequency wh is set to be twice the frequency of the single-phase AC voltage or below as an optimal setting example. It should be appreciated, however, that the lower cut-off frequency wh is not necessarily set to be exactly twice the frequency of the single-phase AC voltage or below. In other words, it is possible to ease the resonance characteristics of the output voltage pulsation at least by setting the lower cut-off frequency wh to the upper limit of the motor rotational frequency or below and adjusting the compensation gain Kp correspondingly.

Figure 15A:
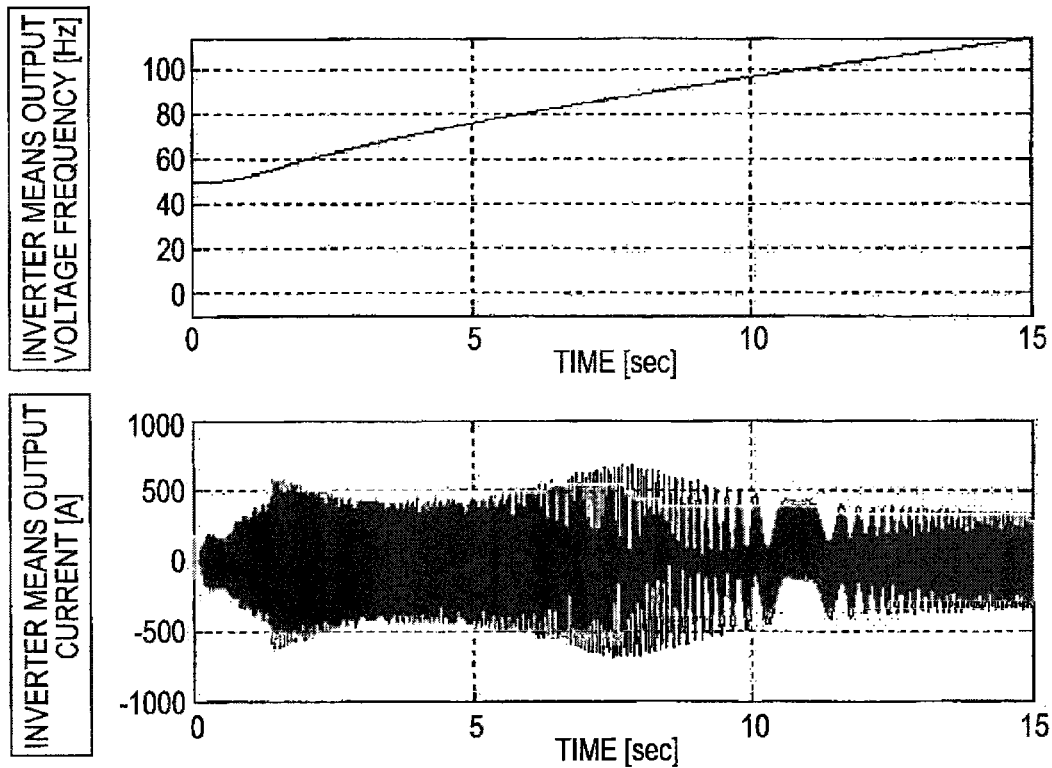
FIG. 15A showing a case where neither the first compensation means nor the second compensation means is additionally provided, and FIG. 15B showing a case where the first compensation means alone is additionally provided without additionally providing the second compensation means.
Figure 15B:
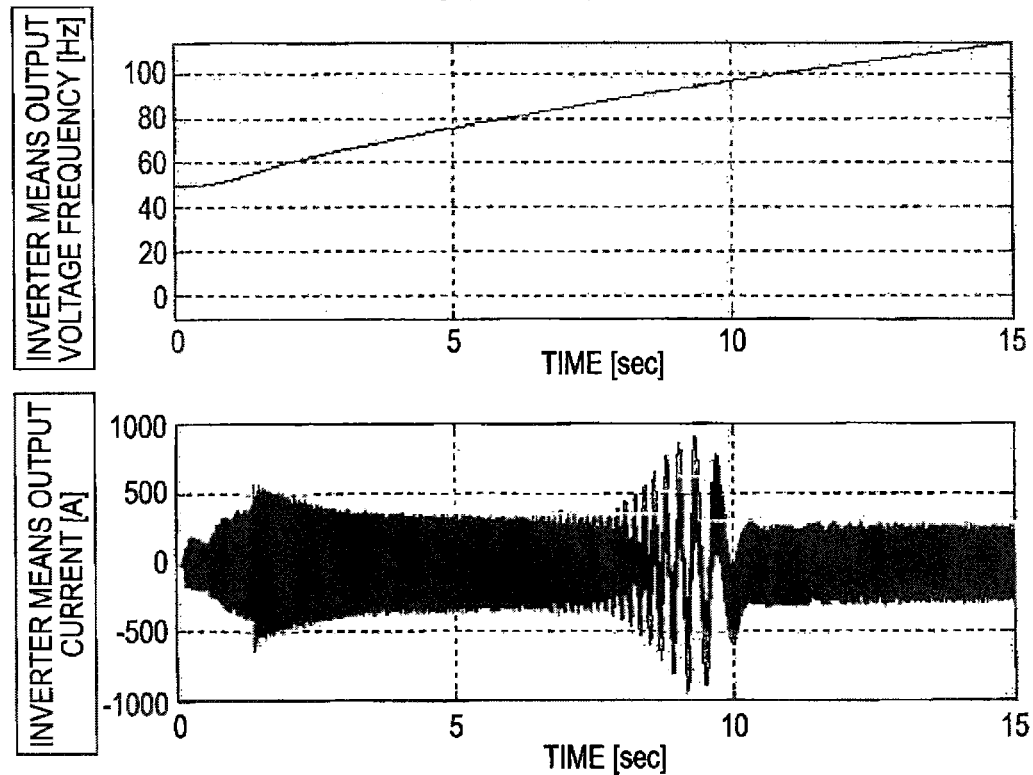
FIG. 15 is a measurement diagram showing an acceleration simulation result of the motor.
Figure 16:
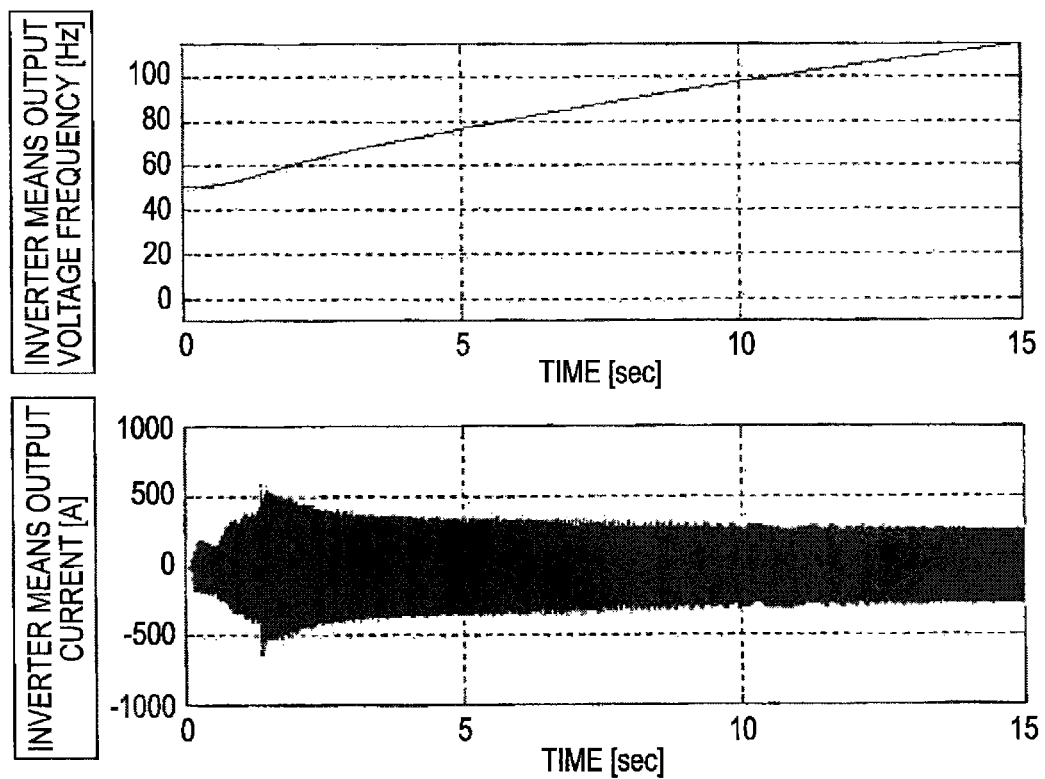
FIG. 16 is a measurement diagram showing an acceleration simulation result of the motor in a case where both of the first compensation means and the second compensation means are additionally provided.

FIGS. 15A and 15B and FIG. 16 show an acceleration simulation result of the motor by a combination of a 50-Hz single-phase AC voltage input, the converter means, the inverter means, and a large-capacity motor (with a circuit constant same as the one used for analysis in FIG. 6 through FIG. 8). It should be noted, however, that the first compensation means and the second compensation means are set as follows.

TABLE 1

| Figure No. showing simulation result | First compensation means | Second compensation means |
|---|---|---|
| FIG. 15A | Absent | Absent |
| FIG. 15B | Present | Absent |
| FIG. 16 | Present | Present |

A relation between the figure numbers showing the simulation result and whether the first compensation means and the second compensation means were absent or present in the simulation is as follows. FIG. 15A shows the result in a case where both are absent. FIG. 15B shows the result in a case where the first compensation means is present and the second compensation means is absent. FIG. 16 shows the result in a case where both are present.

In FIG. 15A showing a case where neither the first compensation means nor the second compensation means is provided, a beat occurs in an output current of the inverter means around the time at which the output voltage frequency of the inverter means reaches 100 Hz. Also, because the resistance value is small due to a large capacity of the motor, the resonance characteristics of the motor exert influences, so that a beat in the output current of the inverter means consequently reaches a maximum in a period during which the output voltage frequency of the inverter means is in the vicinity of 90 Hz.

In FIG. 15B showing a case where the first compensation means 110 alone is provided, an extreme beat occurs in an output current of the inverter means 3 in a region in which the output voltage frequency of the inverter means 3 is about 90 Hz. It is difficult to suppress this beat phenomenon by adjusting and setting the first compensation means 110 as the related art alone. On the other hand, in FIG. 16 showing the result under the condition that both of the first compensation means 110 and the second compensation means 111 are provided, it can be confirmed that the AC motor can be accelerated while controlling the inverter output current in a satisfactory manner by suppressing beats in the vicinity of the both output voltage frequencies of the inverter means of 90 Hz and 100 Hz.

As has been described, in order to suppress a beat in an inverter output current resulting from a pulsation of a frequency component twice the frequency of the single-phase AC voltage superimposed on the DC voltage, as is shown in FIG. 1, the second compensation means for applying low frequency cutoff processing and gain processing to a current outputted from the inverter means is provided in addition to a function of the first compensation means for extracting and then suppressing the frequency component twice the frequency of the single-phase AC voltage. Owing to this configuration, the resonance characteristics resulting from the motor can be eased. It thus becomes possible to obtain an effect that a beat in the inverter output current can be suppressed without depending on response characteristics of the motor.

Also, by using the inverter output current after the coordinate conversion processing to the dq axes as an input to the second compensation means, it becomes possible to obtain an effect that the resonance characteristics resulting from the motor can be eased more appropriately and easily. Also, by applying the low frequency cutoff processing by the second compensation means to a frequency region at twice the frequency of the single-phase AC voltage or below, it becomes possible to obtain an effect that the resonance characteristics resulting from the motor can be eased more appropriately and easily.

In the first embodiment, it is configured in such a manner that the speed detection means 5 detects a rotational speed of the AC motor 4. However, as is found in NPL 2, there is so-called speed sensorless technique by which the function of the speed detection means 5 is replaced by a method of obtaining rotational speed information by an estimation operation on the basis of output voltage information of the inverter and input current information of the inverter. In a configuration adopting this speed sensorless control technique, it is also possible to obtain an effect that a beat in the inverter output current can be suppressed without depending on the response characteristics of the motor by additionally providing the first compensation means and the second compensation means in the same manner as above.

Second Embodiment

Figure 17:
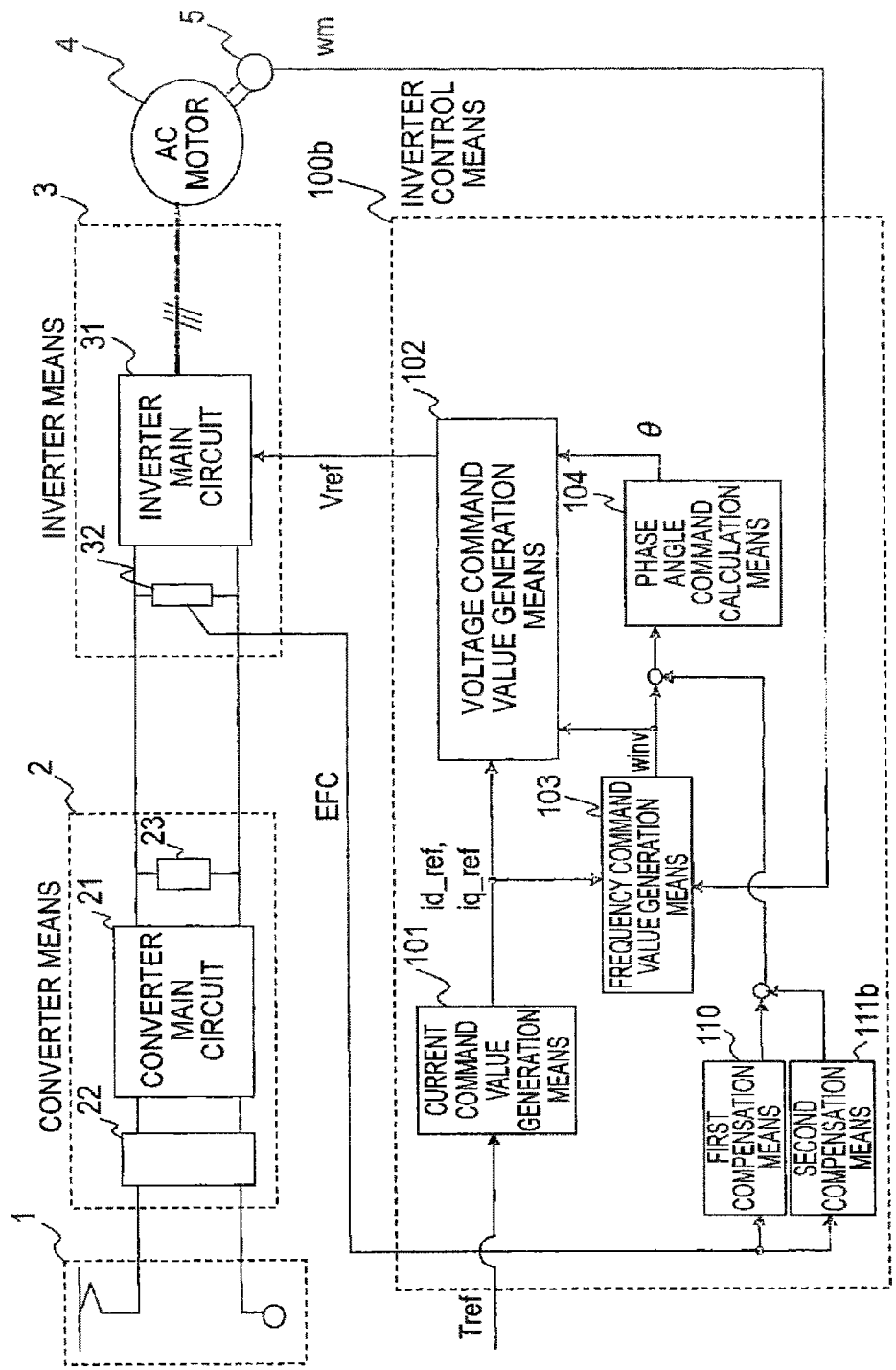
FIG. 17 is a schematic circuit diagram showing a configuration example of a power conversion device according to a second embodiment of the invention.

FIG. 17 shows a power conversion device of a second embodiment. The single-phase AC power supply 1, the converter means 2, the inverter means 3, the AC motor 4, and the speed detection means 5 are the same as the respective counterparts in the first embodiment above, and a description is omitted herein.

A difference from the inverter control means 100 of the first embodiment above and the second compensation means 111 of the first embodiment above are that alpha-numeral 100b denotes inverter control means and an input to second compensation means 111b is the DC voltage EFC instead of the q-axis current. Even when configured in this manner, it becomes possible to obtain the effects same as those of the first embodiment above.

Figure 18:
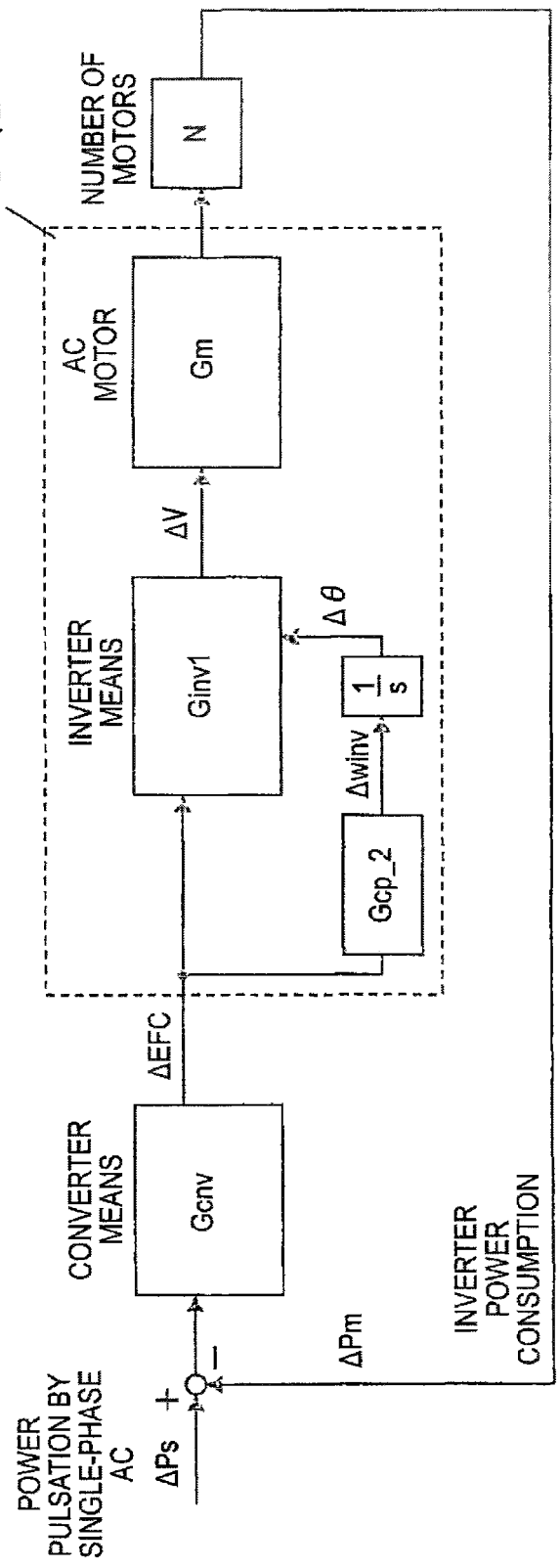
FIG. 18 is a loop diagram of a circuit system in a case where second compensation means of the second embodiment is additionally provided, showing respective state quantities of converter means, inverter means, an AC motor, and inverter control means represented as transmission inputs and outputs.
Figure 19A:
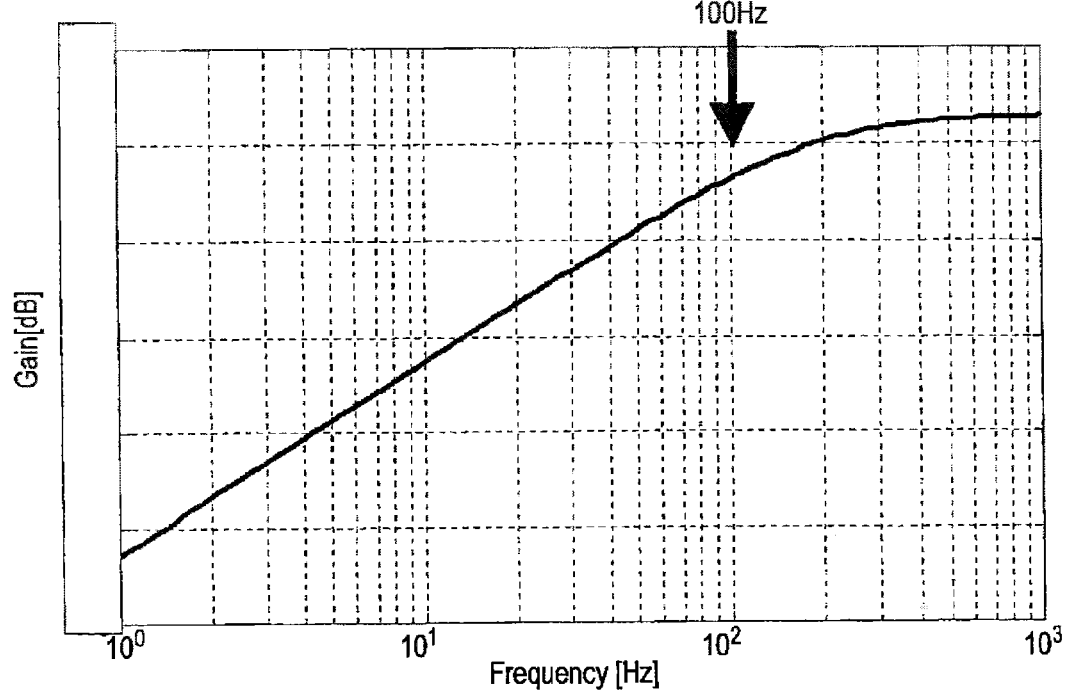
FIG. 19 is a Bode diagram showing input and output transmission characteristics of the second compensation means of the second embodiment.
Figure 19B:
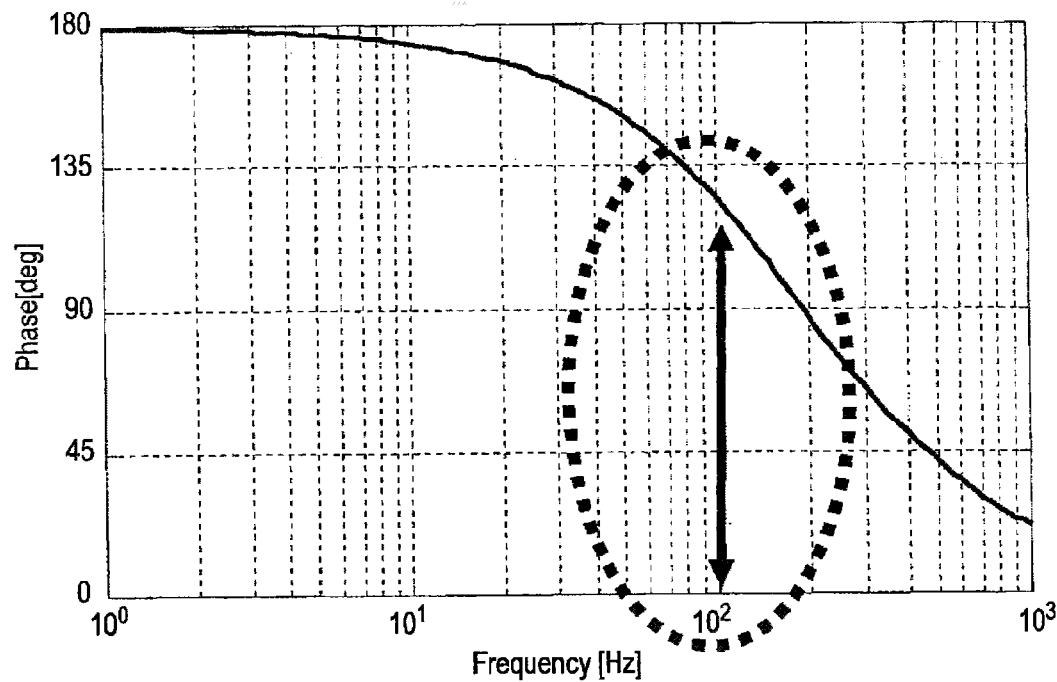

FIG. 18 shows a block diagram of the transmission characteristics of FIG. 17. Herein, the second compensation means 111b has transmission characteristics Gcp_2 made up of high-pass processing and gain processing and set as in Equation (17) below using the DC voltage EFC as an input and the compensation frequency Δwinv as an output. The second compensation means 111b of the second embodiment is provided with secondary characteristics as the low frequency cutoff characteristics. FIG. 19 shows the transmission characteristics.

(Math. 17)

$$\Delta winv = Gcp\_2 \cdot EFC = Kcp \cdot \left(\frac{s}{s+\omega h}\right)^2 \cdot EFC \quad (17)$$

(Math. 18)

$$\Delta\theta = \frac{1}{s} \cdot \Delta winv = \frac{1}{s} \cdot Gcp\_2 \cdot EFC \quad (18)$$

Figure 20A:
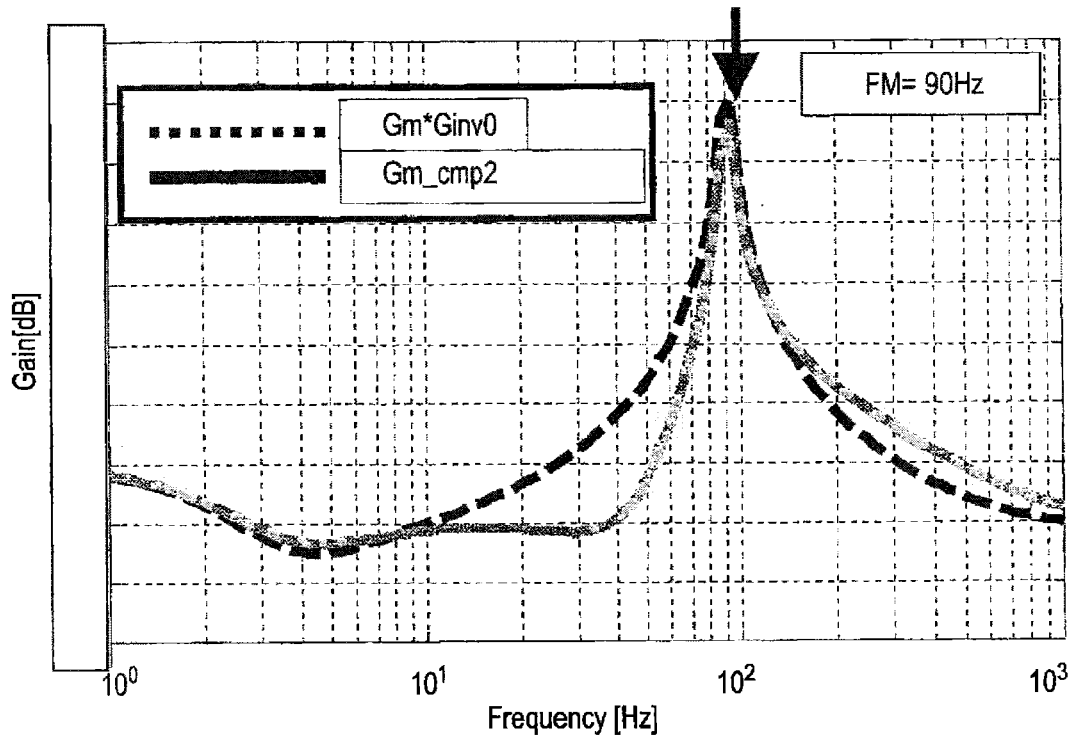
FIG. 20 is a Bode diagram used to describe an effect of improvements of the transmission characteristics of the inverter means, the AC motor, and the inverter control means by the second compensation means of the second embodiment.
Figure 20B:
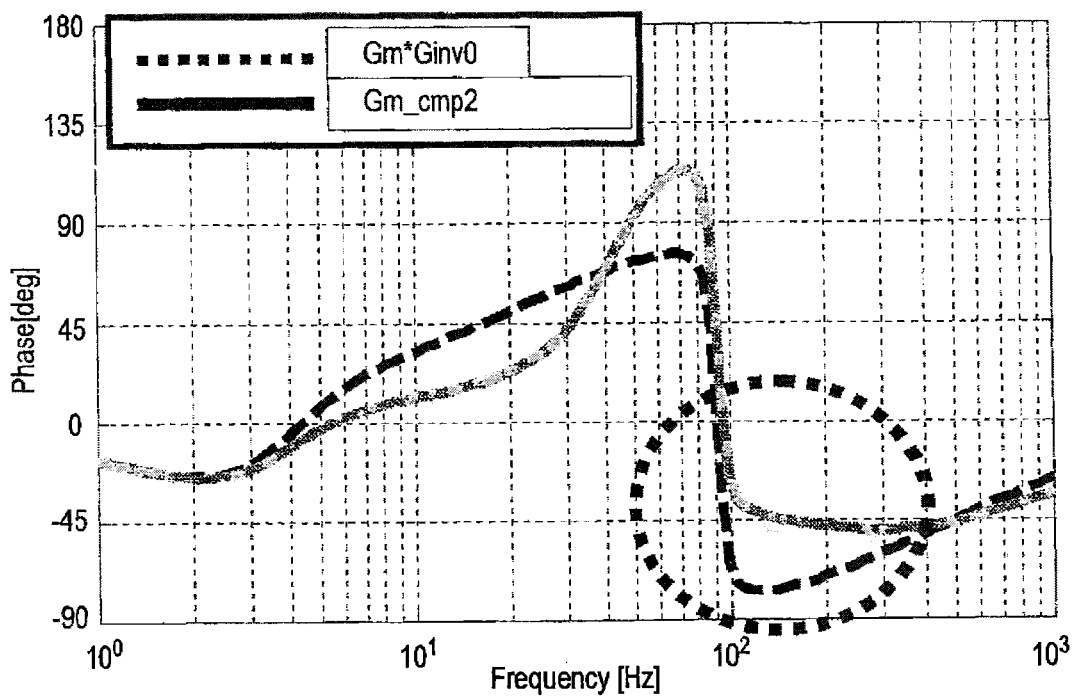

Given that the DC voltage EFC and Δθ when a compensation amount is understood as a phase angle are an input and the inverter output voltage compensation is an output, then the transmission characteristics of the inverter means are given as Ginv1 in Equation (14) above. As is indicated by a dotted frame of FIG. 18, Gm_cmp2 is given as the transmission characteristics from the DC voltage pulsation ΔEFC to the inverter power consumption pulsation in consideration of the compensation result on the transmission characteristics of the AC motor, Gm, by the transmission characteristics of the inverter means, Ginv1, in Equation (14) above and the transmission characteristics of the second compensation means, Gcp_2, in Equations (17) and (18) above. FIG. 20 shows the transmission characteristics Gm_cmp2. The transmission characteristics Gm*Ginv (Equations (4) and (5)) from the DC voltage pulsation ΔEFC to the inverter power consumption pulsation ΔPm in a case where the second compensation means is not provided are also shown for comparison.
(Constants and operation conditions used for analysis in FIG. 19 and FIG. 20)

second compensation means: lower cut-off frequency coh in Equation (17), herein 1200 rad/sec second compensation means: compensation gain Kcp in Equation (17), herein 2000 circuit constant of motor: a constant for large-capacity motor with low resistance (same as the constant used in FIG. 6 through FIG. 8)

motor rotational frequency: 90 Hz (electric angle)

As is shown in FIG. 20, the transmission characteristics of the transmission characteristic Gm*Ginv0 in the absence of the second compensation means have the resonance characteristics in the vicinity of the motor rotational frequency. These characteristics, when combined with the transmission characteristics of the converter, Gcnv, expressed by Equation (3) above, become a factor that makes the DC voltage pulsation ΔEFC too large as has been described in the first embodiment above.

On the other hand, in the transmission characteristics Gm_cmp2 in the presence of the second compensation means, it can be confirmed from a portion enclosed by a dotted line of FIG. 20 that the phase characteristics of the 2f frequency of the single-phase power supply lead and are compensated for. Physically, as can be understood from FIG. 19 showing the transmission characteristics of the second compensation means 111b, the phase characteristics are operated more intensively than the gain characteristics by extracting a pulsation component of the DC voltage EFC and operating a frequency command value by the inverter in a direction in which a phase-lead compensation is made for the motor output pulsation.

Then, the open loop transmission characteristics Gopen2 are defined as follows.
(Math. 19)

$$Gopen2 = N \cdot Gm\_cmp2 \cdot Gcnv \quad (19)$$

Also, in contrast to the open loop transmission characteristics Gopen2, the closed loop transmission characteristics Gclose2 are defined by Equation (19) as follows.

(Math. 20)

$$\frac{\Delta Pm}{\Delta Ps} = Gclose2 = Gopen2 \cdot (1 + Gopen2)^{-1} \quad (20)$$

Figure 21A:
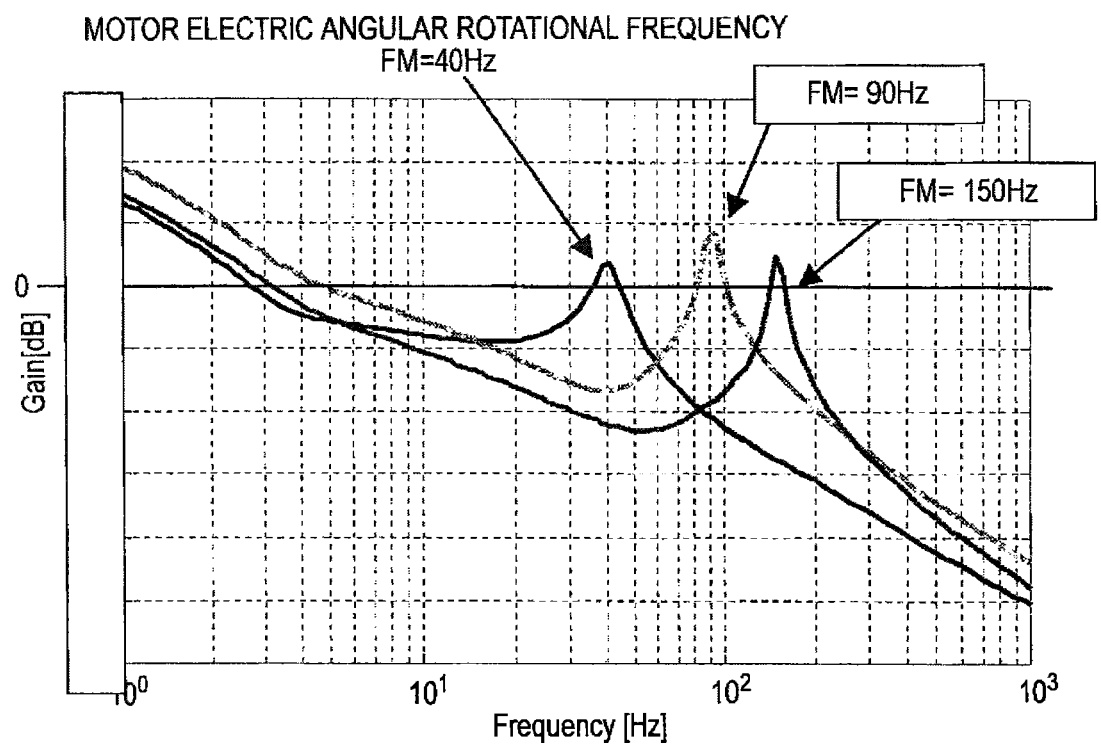
FIG. 21 is a Bode diagram showing open loop transmission characteristics in a case where the second compensation means of the second embodiment is additionally provided.
Figure 21B:
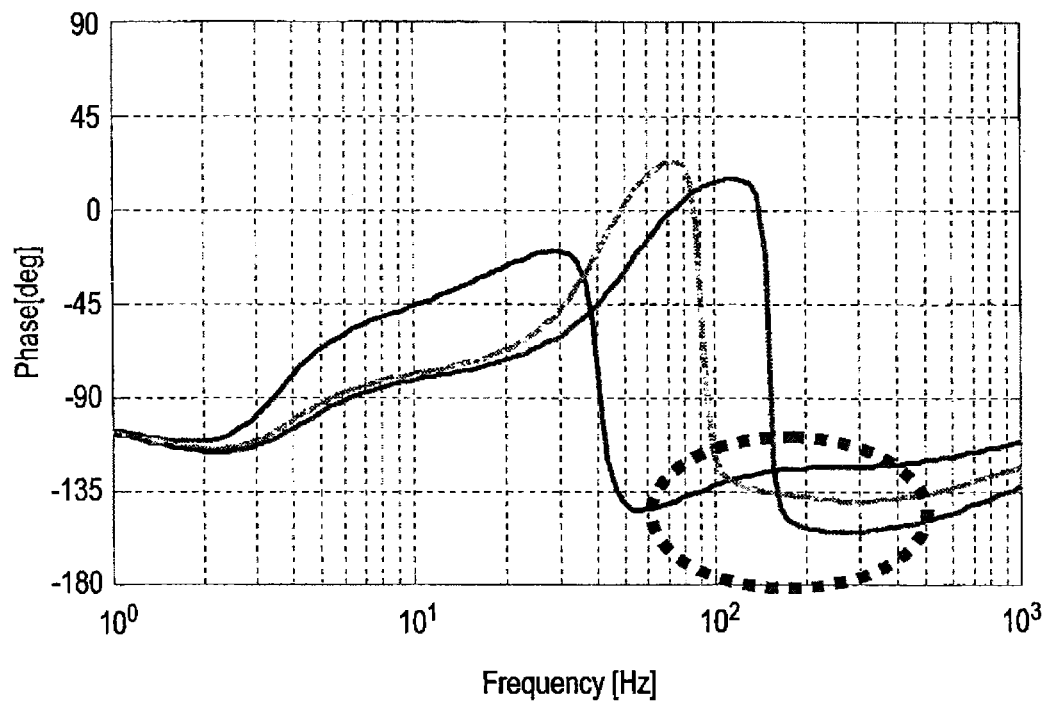
Figure 22A:
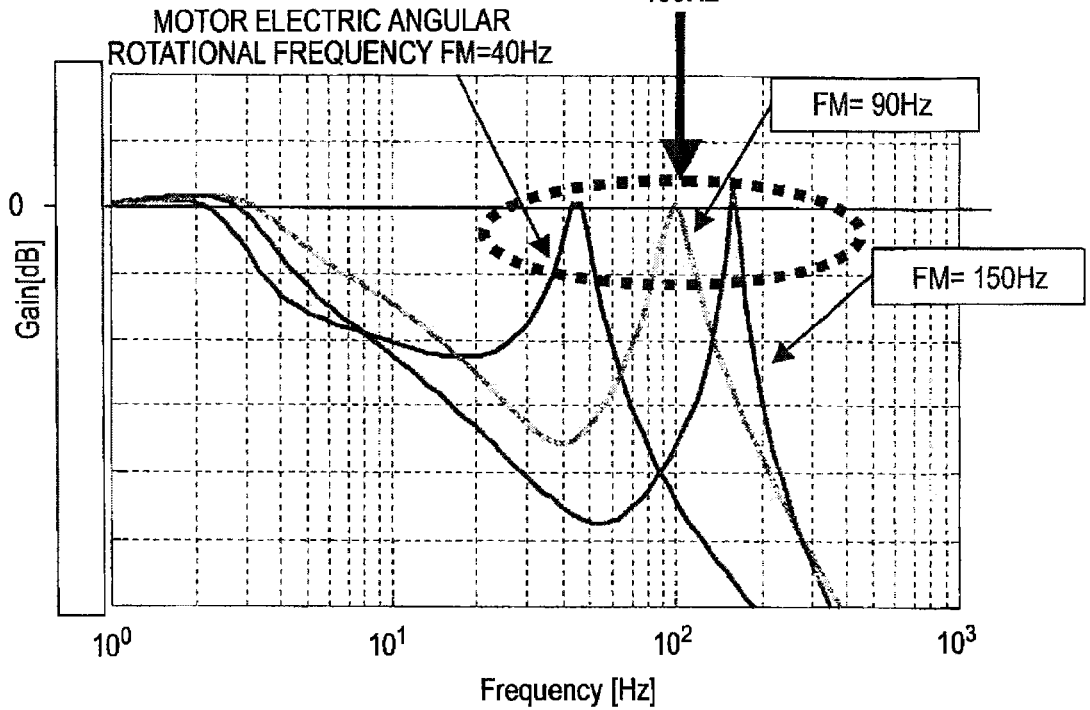
FIG. 22 is a Bode diagram showing closed loop transmission characteristics in a case where the second compensation means of the second embodiment is additionally provided.
Figure 22B:
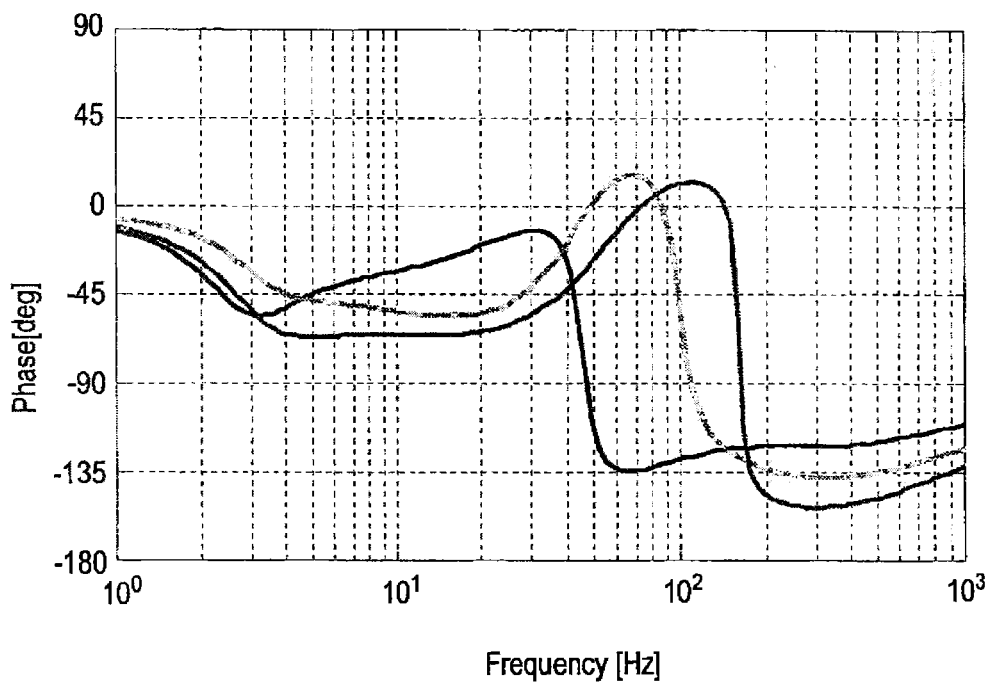
Figure 23A:
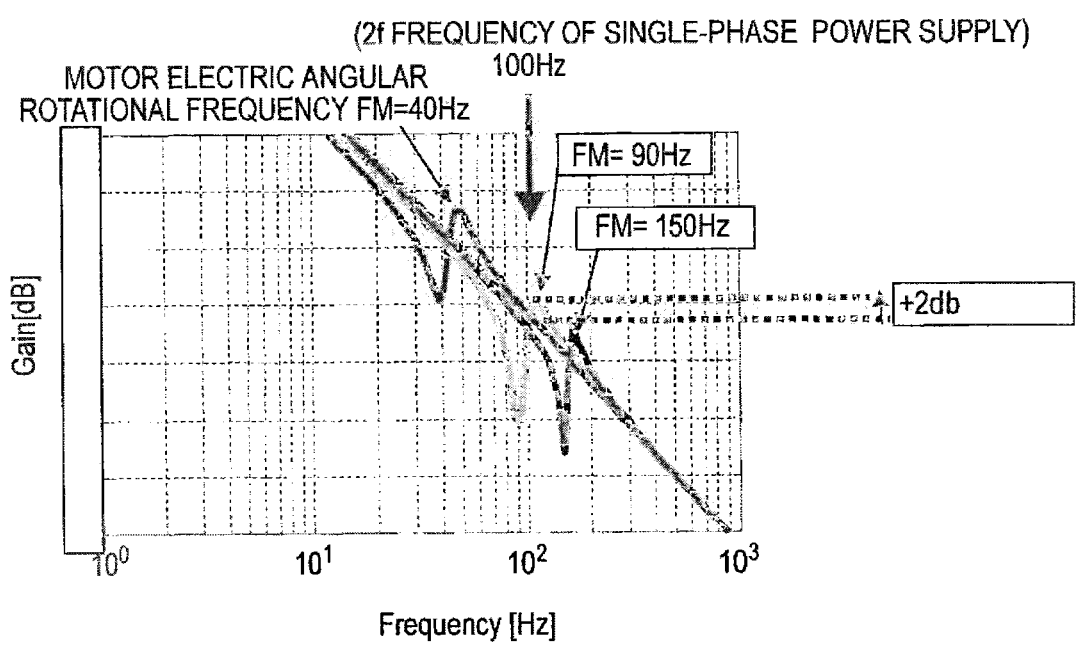
FIG. 23 is a Bode diagram showing closed loop transmission characteristics of a single-phase AC input from a power pulsation to a smoothing capacitor voltage in a case where the AC motor is driven by additionally providing the second compensation means of the second embodiment.
Figure 23B:
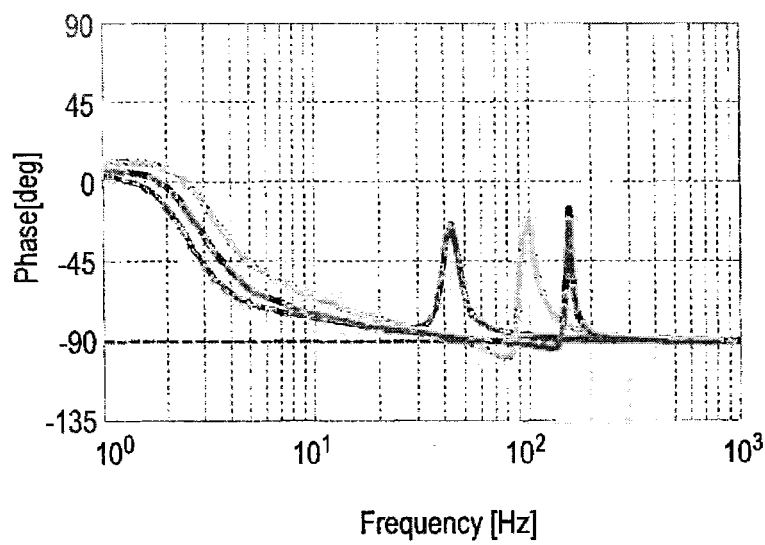

FIG. 21 and FIG. 22 show, respectively, the open loop characteristics Gopen2 and the closed loop characteristics Gclose2 in a case where the second compensation means of the second embodiment is additionally provided. FIG. 23 shows the transmission characteristics of a single-phase AC input from the power pulsation ΔPs to the DC voltage ΔEFC confirmed by closing the loop in the same manner as in FIG. 22.

Constants and operation conditions used for analysis in FIG. 21 through FIG. 23 are constants for a large-capacity motor and speed conditions same as those in FIG. 6 through FIG. 8.

A comparison between FIG. 6 showing the open loop characteristics Gopen0 in a case where the second compensation means is not additionally provided and FIG. 21 showing the open loop characteristics in a case where the second compensation means of the second embodiment is additionally provided reveals that, as is indicated by a portion enclosed by a dotted line in FIG. 21, the phase in the vicinity of 100 Hz leads and is compensated for, so that the phase at the gain of 0 [dB] has a larger margin from −180 [deg]. Consequently, in comparison with the closed loop characteristics in the absence of the second compensation means shown in FIG. 7, the resonance characteristics are suppressed in the closed loop characteristics shown in FIG. 22.

Likewise, the transmission characteristics of the single-phase AC input from the power pulsation ΔPs to the DC voltage ΔEFC are compared. As has been discussed already, in the case of FIG. 8 in the absence of the second compensation means, amplification is + about 10 dB (about 3.2 times) due to the characteristics of the converter (smoothing capacitor) alone at the 2f frequency of the single-phase power supply. Hence, there is a possibility that it becomes difficult to secure the beat suppression function by the first compensation means alone. In contrast, in the case of FIG. 23 where the second compensation means of the second embodiment is additionally provided, the resonance characteristics are eased to approximately + about 2 dB (about 1.3 times) due to the characteristics of the converter (smoothing capacitor) alone. Hence, it becomes possible to secure the beat suppression function by the first compensation means.

As has been described, in order to suppress a beat in the inverter output current resulting from a pulsation of the frequency component twice the frequency of the single-phase AC voltage superimposed on the DC voltage, as is shown in FIG. 17, the second compensation means for cutting off a lower frequency and applying the gain processing to a DC voltage outputted from the converter means is provided in addition to the function of the first compensation means for extracting and then suppressing the frequency component twice the frequency of the single-phase AC voltage. Owing to this configuration, it becomes possible for the phase characteristics in the vicinity of the frequency component twice the frequency of the single-phase AC voltage in the open loop transmission characteristics to lead and be compensated for. Hence, even in the presence of the resonance characteristics of the motor, the resonance characteristics of the closed loop transmission characteristics can be eased. It thus becomes possible to obtain an effect that a beat in the inverter output current can be suppressed without depending on the response characteristics of the motor.

The first embodiment above and the second embodiment have described the configuration in which outputs of the first compensation means and the second computation means compensate for the frequency command. It should be appreciated, however, that it can be said that the outputs indirectly compensate for a phase angle command, a voltage command, and further a torque command and a current command, as described above. Hence, it goes without saying that even when it is configured in such a manner that the first compensation means and the second compensation means make compensation using at least one of a torque compensation amount, a current command compensation amount, a voltage command compensation amount, and a frequency command compensation amount, and a phase angle compensation amount, the same effects can be obtained.

When consideration is given to a fact that the generation method of the frequency command depends on the current command generation method and the torque command, even when it is configured in such a manner that the second compensation means operates a current command or a torque command and sets a gain operation correspondingly, the same effects can be obtained.

Further, the first embodiment above and the second embodiment have described the configuration in which a DC voltage, which is an output of the converter means, or an inverter output current, which is an output of the inverter means, is selected as an input to the first compensation means and the second compensation means. However, it may be configured in such a manner that these state quantities are obtained by estimation operation. For example, indirect estimation operation is possible for an output current of the inverter means, in particular, a q-axis current, through estimation of a torque by dividing input power to the inverter means by a rotational speed of the AC motor. Even when these indirect estimation operation values are used as an input to the first compensation means or the second compensation means, the same effects can be obtained.

Third Embodiment

Figure 24:
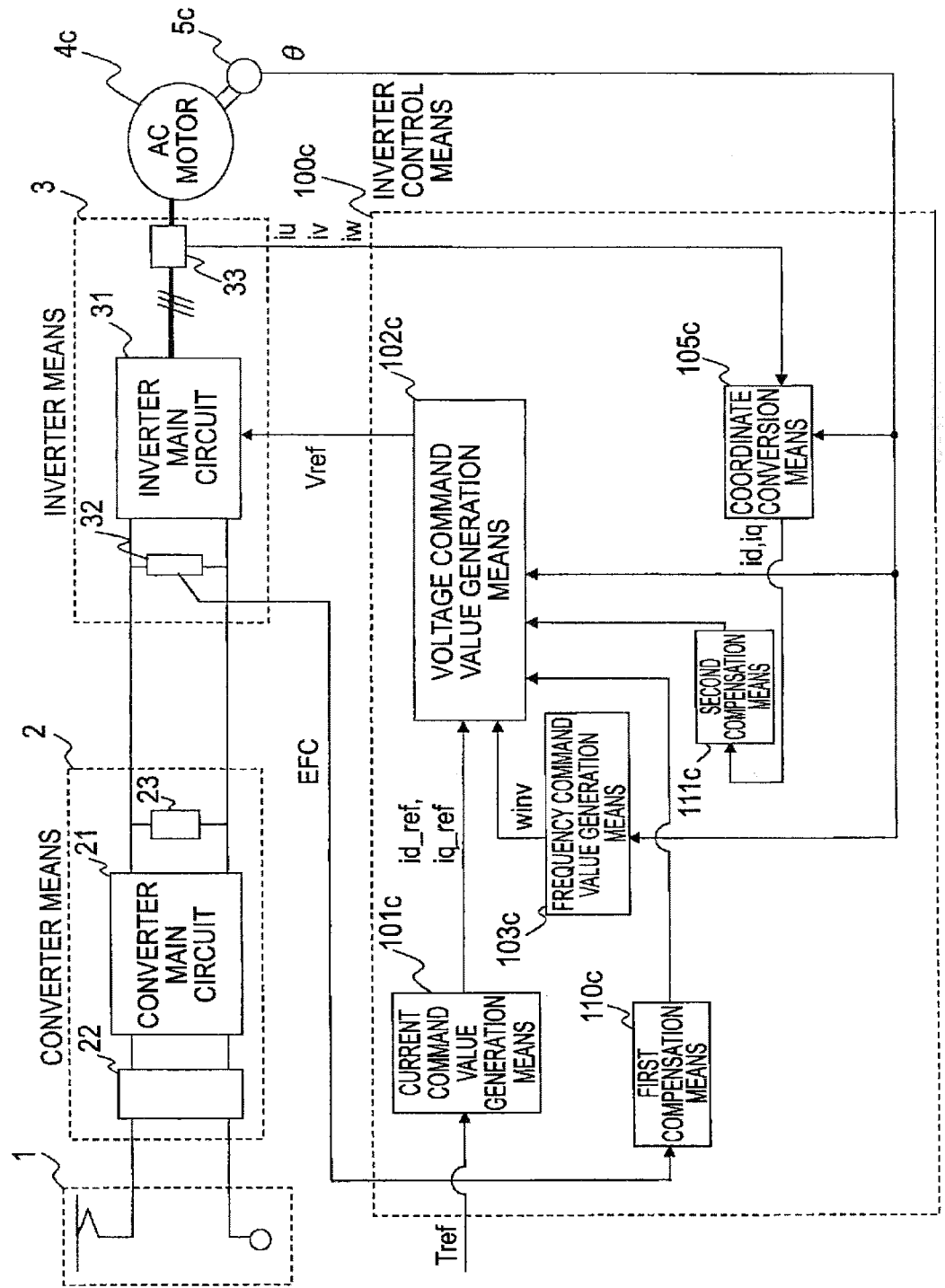
FIG. 24 is a schematic circuit diagram showing a configuration example of a power conversion device according to a third embodiment of the invention.

FIG. 24 shows a configuration of a third embodiment. The single-phase AC power supply 1, the converter means 2, and the inverter means 3 are the same as the respective counterparts of the first and second embodiments above. On the other hand, a difference from the first and second embodiments above is that an AC motor 4c is a synchronous motor and alpha-numeral 5c denotes position detection means for detecting a magnetic pole position. In addition, inverter control means 100c is means corresponding to a synchronous motor.

In a case where the AC motor 4c is a synchronous motor, vector control is performed using a rotor magnetic pole position in the synchronous motor as a reference axis. In other words, a magnetic pole position is detected by the phase detection means 5c and an output current of the inverter means is converted by coordinate conversion on dq axes by the coordinate conversion means 105c according to the detected magnetic pole position. Also, current command value generation means 101c generates a d-axis current command id_ref and a q-axis current command iq_ref by setting the d-axis as the reference axis on the magnetic pole position and using the torque command value and the motor circuit constant. Frequency command value generation means 103c obtains a frequency command value winv by differentiation of the magnetic pole position information. Voltage command value generation means 102c generates a voltage command value using the current command values id_ref and iq_ref, the frequency command value winv, and the motor circuit constant obtained in advance, and converts the voltage command value to an AC voltage using the magnetic pole position information as the reference axis. The voltage command value is outputted to the inverter means 3.

The first compensation means 110c finds a compensation amount by extracting a frequency component twice the frequency of the single-phase AC voltage from the DC voltage value Vdc detected by the voltage detection means 32 and applies the gain processing to the extraction result. The compensation amount is outputted to the voltage command value generation means 102c.

The configuration above operates equivalently to an operation by the configuration that a synchronous motor is driven with power supplied from an AC power supply as described, for example, in the first embodiment of PTL 6. Accordingly, a detailed description is omitted herein. On the contrary, the second compensation means 111c finds a phase angle compensation amount by cutting off a frequency region at or below twice the frequency of the single-phase AC voltage from a q-axis current obtained by the coordinate conversion means 105c and applying the gain processing to the result, and outputs the phase angle compensation amount to the voltage command value generation means 102c.

An example of the transmission characteristics from the q-axis current to the phase angle compensation amount Δθ in the second compensation means 111c is expressed by Equation (21) as follows.

(Math. 21)

$$\Delta\theta = \frac{1}{s} \cdot \text{Gcp\_3} \cdot iq = Kcp \cdot \frac{s}{s+\omega h} \cdot iq \qquad (21)$$

The voltage command value generation means 102c reflects compensation amounts of both of the first compensation means 110c and the second compensation means 111c on a voltage command value to be outputted to the inverter means 3 and outputs the result.

Even in a case where the AC motor 4c is a synchronous motor, the resonance characteristics appear in the vicinity of the motor rotational frequency in the transmission characteristics from the DC voltage pulsation ΔEFC to the inverter power consumption pulsation ΔPm as in the first and second embodiments above. By extracting a pulsation of a torque current, Δiq, and making compensation for the inverter output voltage by the second compensation means 111c in the same manner as in the first embodiment above, the resonance characteristics in a frequency band including the 2f frequency of the single-phase power supply can be eased. It thus becomes possible to suppress amplification of the DC voltage pulsation ΔEFC. Consequently, the beat suppression function by the first compensation means 110c can be secured.

As has been described, even in a case where the AC motor is a synchronous motor, in order to suppress a beat in an inverter output current resulting from a pulsation of a frequency component twice the frequency of the single-phase AC voltage superimposed on the DC voltage, as is shown in FIG. 24, the second compensation means for cutting off a lower frequency of an inverter output current outputted from the inverter means and applying gain processing to the frequency cut-off result is provided in addition to a function of the first compensation means for extracting and then suppressing the frequency component twice the frequency of the single-phase AC voltage. Owing to this configuration, the resonance characteristics resulting from the motor can be eased. It thus becomes possible to obtain an effect that a beat in the inverter output current can be suppressed without depending on response characteristics of the motor. Also, by using the inverter output current after the coordinate conversion processing on the dq axes as an input to the compensation means, it becomes possible to obtain an effect that the resonance characteristics resulting from the motor can be eased more appropriately and easily.

Also, by applying the low frequency cut-off processing to a frequency region at twice the frequency of the single-phase AC voltage or below by the second compensation means, it becomes possible to obtain an effect that the resonance characteristics resulting from the motor can be eased more appropriately and easily. The third embodiment adopts the configuration in which the magnetic pole position of the AC motor 4 is detected by the position detection means 5c. However, as is found in NPL 3, there is so-called position sensorless technique by which the function of the position detection means 5c is replaced by a method of obtaining magnetic pole position information by an estimation operation on the basis of output voltage information of the inverter and input current information of the inverter. Even with a configuration adopting this position sensorless control technique, it is also possible to obtain an effect that a beat in the inverter output current can be suppressed without depending on the response characteristics of the motor by additionally providing the first compensation means and the second compensation means in the same manner as above.

REFERENCE SIGNS LIST

1: single-phase AC power supply, 2: converter means,
3: inverter means, 4: AC motor, 5: speed detection means,
5c: position detection means, 21: converter main circuit,
22: input transformer, 23: smoothing capacitor,
31: inverter main circuit, 32: voltage detection means,
33: current detection means,
100, 100b, and 100c: inverter control means,
101 and 101c: current command value generation means,
102 and 102c: voltage command value generation means,
103 and 103c: frequency command value generation means,
104: phase angle command calculation means,
105 and 105c: coordinate conversion means,
110 and 110c: first compensation means,
111, 111b, and 111c: second compensation means.

The invention claimed is:

1. A power conversion device, comprising:
a converter for converting a single-phase AC voltage to a DC voltage through rectification;
an inverter for feeding a motor by converting the DC voltage as an output of the converter to an AC voltage;
a current command value generation unit for outputting a current command value for the motor according to a torque command value;
a frequency command value generation unit for outputting a frequency command value of the AC voltage for the motor according to a speed signal of the motor;
a phase angle command value generation unit for calculating a phase angle command value on the basis of speed information or axis position information of the motor;
a voltage command value generation unit for generating a voltage command value to the inverter using the current command value, the frequency command value, and the phase angle command value; and
a compensation unit for adding a compensation value to or subtracting the compensation value from at least one of the torque command value, the current command value, the voltage command value, the frequency command value, and the phase angle command value,
the compensation unit includes:
a first compensation unit for extracting a frequency component twice a frequency of the single-phase AC voltage from the DC voltage outputted from the converter or a current outputted from the inverter to apply gain processing to the extracted component, and using a result of the processing as the compensation value; and
a second compensation unit for applying low frequency cut-off processing to the DC voltage outputted from the converter or a current outputted from the inverter, using a frequency selected at or below an electric angular maximum frequency of the motor as a cut-off frequency to apply gain processing to the processed component, and using a result of the processing as the compensation value.

2. The power conversion device according to claim 1 wherein;
a d-axis current, which is a flux phase component, or a q-axis current, which is a component orthogonal to the flux phase, is extracted by subjecting the current outputted from the inverter to coordinate conversion processing so as to convert the current onto dq-axis coordinates, which are rotational biaxial coordinates using the flux phase of the motor as a reference, and either one of the d-axis current and the q-axis current is used as an input to the first compensation unit or the second compensation unit.

3. The power conversion device according to claim 1, wherein;
the second compensation means applies the low frequency cut-off processing using a frequency selected at or below twice the frequency of the single-phase AC voltage as a cut-off frequency.

4. The power conversion device according to claim 2, wherein;
the second compensation means applies the low frequency cut-off processing using a frequency selected at or below twice the frequency of the single-phase AC voltage as a cut-off frequency.

5. The power conversion device according to claim 1, wherein;
the voltage command value generation unit performs one-pulse control by which the voltage command value is outputted by performing upper limit value setting processing on an amplitude value of a voltage to be applied to the motor.

6. The power conversion device according to claim 2, wherein;
the voltage command value generation unit performs one-pulse control by which the voltage command value is outputted by performing upper limit value setting processing on an amplitude value of a voltage to be applied to the motor.

7. The power conversion device according to claim 1, wherein;
the motor that feeds power is a totally-enclosed type motor in which a rotor of the motor is cooled without depending on intake air from an outside.

8. The power conversion device according to claim 2, wherein;
the motor that feeds power is a totally-enclosed type motor in which a rotor of the motor is cooled without depending on intake air from an outside.

* * * * *